United States Patent
Tokizaki et al.

(10) Patent No.: US 10,853,926 B2
(45) Date of Patent: Dec. 1, 2020

(54) IMAGE PROCESSING DEVICE, IMAGING DEVICE, AND IMAGE PROCESSING METHOD

(71) Applicant: SONY CORPORATION, Tokyo (JP)

(72) Inventors: Yuki Tokizaki, Tokyo (JP); Kazunori Kamio, Kanagawa (JP); Yiwen Zhu, Kanagawa (JP); Takahiro Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 16/087,157

(22) PCT Filed: Jan. 25, 2017

(86) PCT No.: PCT/JP2017/002582
§ 371 (c)(1),
(2) Date: Sep. 21, 2018

(87) PCT Pub. No.: WO2017/169039
PCT Pub. Date: Oct. 5, 2017

(65) Prior Publication Data
US 2019/0102870 A1    Apr. 4, 2019

(30) Foreign Application Priority Data

Mar. 29, 2016   (JP) ................. 2016-065532

(51) Int. Cl.
*G06T 5/50* (2006.01)
*H04N 5/232* (2006.01)
(Continued)

(52) U.S. Cl.
CPC ............. *G06T 5/50* (2013.01); *G06T 3/4061* (2013.01); *G06T 5/002* (2013.01); *G06T 5/003* (2013.01);
(Continued)

(58) Field of Classification Search
CPC ......... G06T 5/50; G06T 3/4061; G06T 5/002; G06T 5/003; H04N 5/232; H04N 5/2351;
(Continued)

(56) References Cited

U.S. PATENT DOCUMENTS

| 8,670,060 B2* | 3/2014 | Jones ................... G06F 3/04883 348/333.01 |
| 2005/0047658 A1* | 3/2005 | Kita ..................... H04N 1/4097 382/167 |

(Continued)

FOREIGN PATENT DOCUMENTS

| CN | 1774030 A | 5/2006 |
| CN | 104854858 A | 8/2015 |

(Continued)

OTHER PUBLICATIONS

International Search Report and Written Opinion of PCT Application No. PCT/JP2017/002582, dated Apr. 4, 2017, 10 pages of ISRWO.

(Continued)

*Primary Examiner* — Michael R Neff
(74) *Attorney, Agent, or Firm* — Chip Law Group

(57) ABSTRACT

A device includes a feature amount calculating unit for receiving an infrared light image and a visible light image and extracting a feature amount from at least one of the images and an image correcting unit for executing pixel value correction processing on the infrared light image on the basis of a reference area and a correction parameter determined depending on the feature amount. The device further includes a tap selection unit for determining the reference area used for the pixel value correction on the basis of the feature amount and a correction parameter calculating unit for determining the correction parameter used for the pixel value correction on the basis of the feature amount. The image correcting unit executes the pixel value (Continued)

correction processing in which a tap determined by the tap selection unit and the correction parameter determined by the correction parameter calculating unit are applied.

14 Claims, 22 Drawing Sheets

(51) Int. Cl.
  *H04N 7/18*    (2006.01)
  *G06T 3/40*    (2006.01)
  *H04N 9/09*    (2006.01)
  *H04N 5/33*    (2006.01)
  *G06T 5/00*    (2006.01)
  *H04N 5/235*    (2006.01)
  *H04N 5/243*    (2006.01)

(52) U.S. Cl.
  CPC .......... *H04N 5/232* (2013.01); *H04N 5/2351* (2013.01); *H04N 5/243* (2013.01); *H04N 5/33* (2013.01); *H04N 5/332* (2013.01); *H04N 7/183* (2013.01); *H04N 9/09* (2013.01); *G06T 2207/10048* (2013.01)

(58) Field of Classification Search
  CPC .......... H04N 5/243; H04N 5/33; H04N 5/332; H04N 7/183; H04N 9/09
  USPC ........................................................ 382/254
  See application file for complete search history.

(56) References Cited

U.S. PATENT DOCUMENTS

| | | | |
|---|---|---|---|
| 2005/0213838 A1* | 9/2005 | Kuramoto | H04N 1/4097 |
| | | | 382/254 |
| 2006/0104538 A1 | 5/2006 | Izumi | |
| 2010/0104142 A1* | 4/2010 | Ryou | G06K 9/00577 |
| | | | 382/112 |
| 2013/0300875 A1* | 11/2013 | Strandemar | H04N 5/217 |
| | | | 348/164 |
| 2015/0199795 A1 | 7/2015 | Naruse et al. | |
| 2016/0093034 A1* | 3/2016 | Beck | G06T 5/50 |
| | | | 345/617 |

FOREIGN PATENT DOCUMENTS

| | | |
|---|---|---|
| JP | 2002-237969 A | 8/2002 |
| JP | 2003-259362 A | 9/2003 |
| JP | 2006-140818 A | 6/2006 |
| JP | 2009-071789 A | 4/2009 |
| JP | 2010-033527 A | 2/2010 |
| JP | 2014-197727 A | 10/2010 |
| JP | 2011-211387 A | 10/2011 |
| JP | 2014-197727 A | 10/2014 |
| WO | 2014/050190 A1 | 4/2014 |
| WO | 2014/109349 A1 | 1/2017 |

OTHER PUBLICATIONS

Office Action for JP Patent Application No. 2018-508455, dated Mar. 24, 2020, 05 pages of Office Action and 05 pages of English Translation.

* cited by examiner

FIG. 2A  VISIBLE LIGHT IMAGE

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 2B  FAR-INFRARED LIGHT IMAGE

| FIR | FIR | FIR | FIR |
|-----|-----|-----|-----|
| FIR | FIR | FIR | FIR |
| FIR | FIR | FIR | FIR |
| FIR | FIR | FIR | FIR |

| | FEATURE AMOUNT | SPECIFIC EXAMPLE |
|---|---|---|
| FIG. 6A | 1 | LUMINANCE DISTRIBUTION INFORMATION |
| FIG. 6B | 2 | POINT SPREAD FUNCTION (PSF :Point Spread Function) INFORMATION (FUNCTION INDICATING BLUR AMOUNT) |
| FIG. 6C | | NOISE INFORMATION |

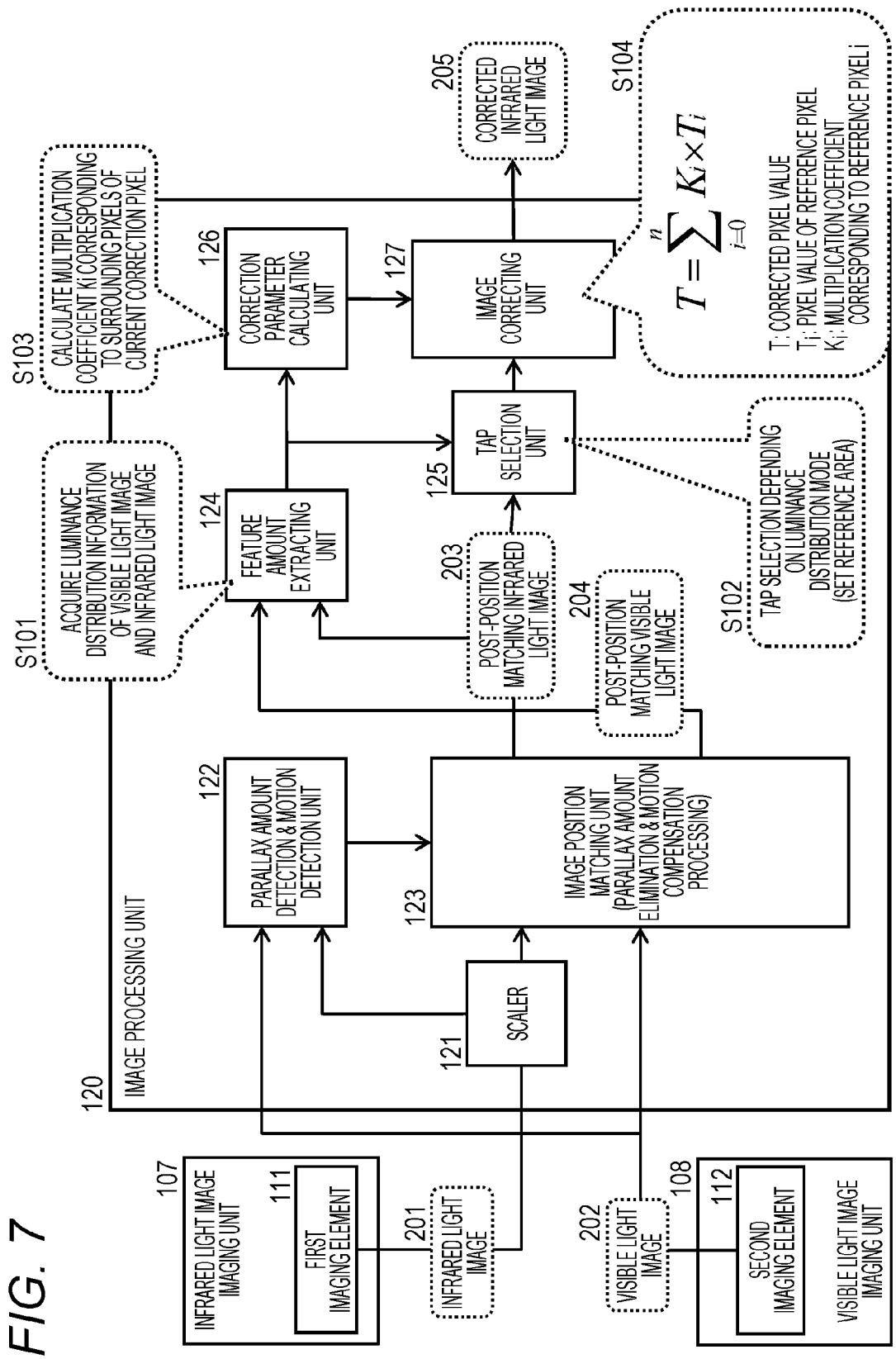

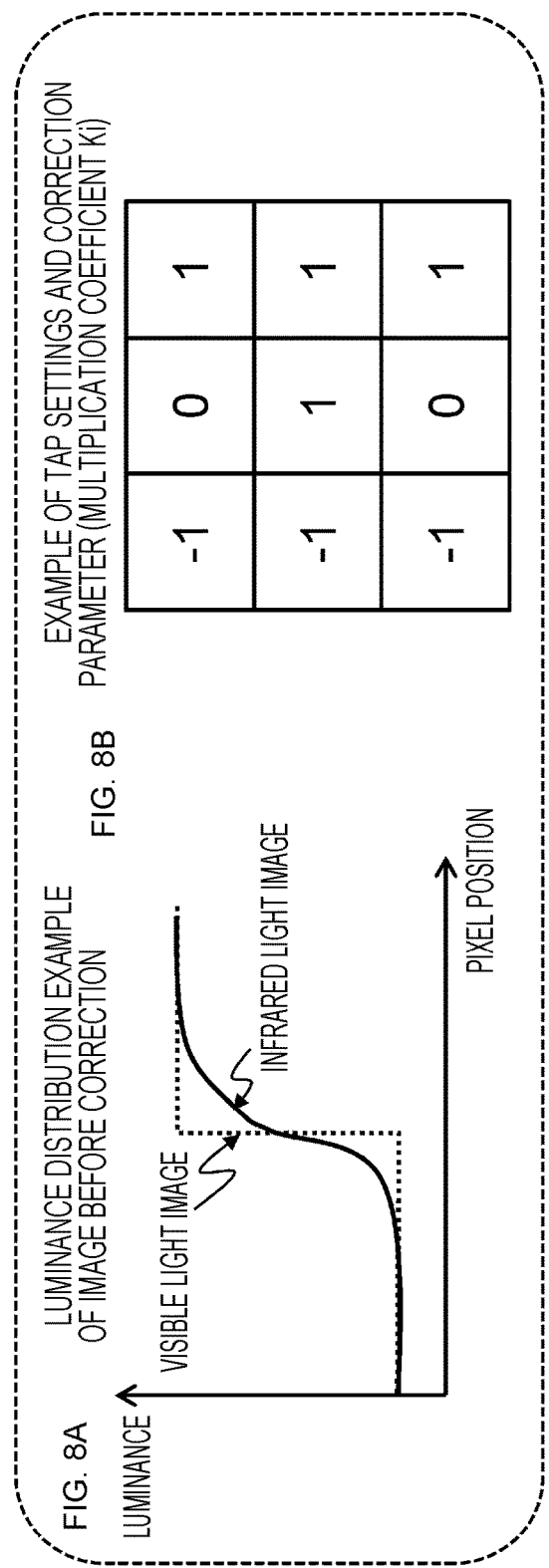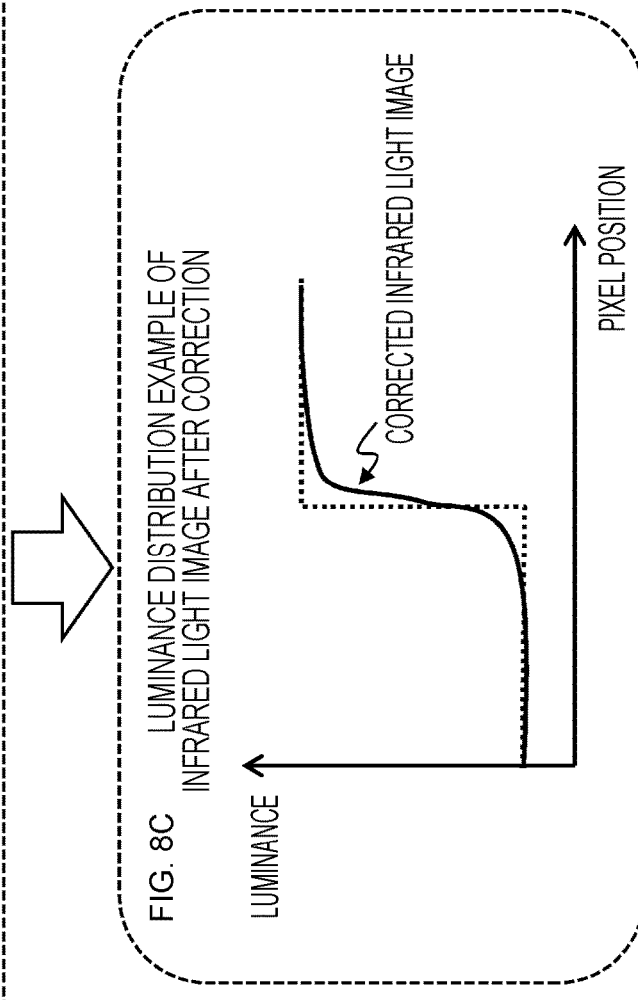

PIXEL VALUE DISTRIBUTION EXAMPLE OF IMAGE BEFORE CORRECTION (SPREAD OF BLUR=NARROW)

EXAMPLE OF TAP SETTINGS AND PARAMETER (MULTIPLICATION COEFFICIENT Ki) FORMING INVERSE FILTER

PIXEL VALUE DISTRIBUTION EXAMPLE OF IMAGE AFTER CORRECTION

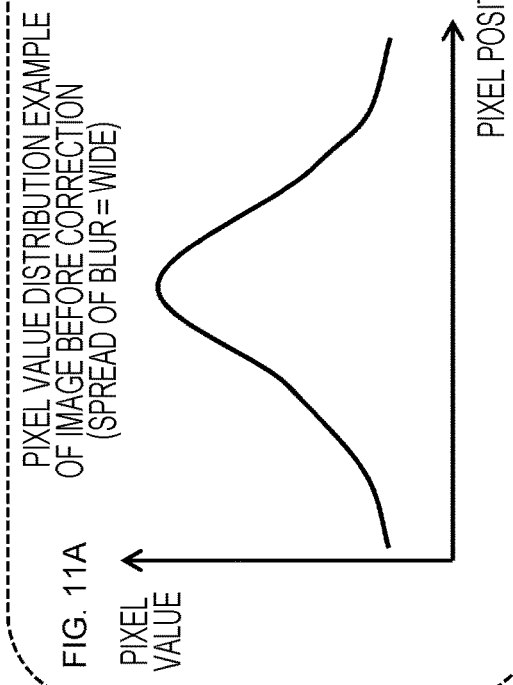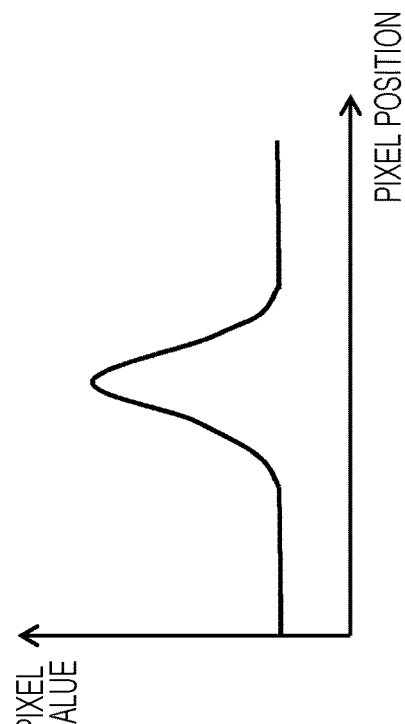
FIG. 11A PIXEL VALUE DISTRIBUTION EXAMPLE OF IMAGE BEFORE CORRECTION (SPREAD OF BLUR = WIDE)
FIG. 11B EXAMPLE OF TAP SETTINGS AND PARAMETER (MULTIPLICATION COEFFICIENT Ki) FORMING INVERSE FILTER
FIG. 11C PIXEL VALUE DISTRIBUTION EXAMPLE OF IMAGE AFTER CORRECTION

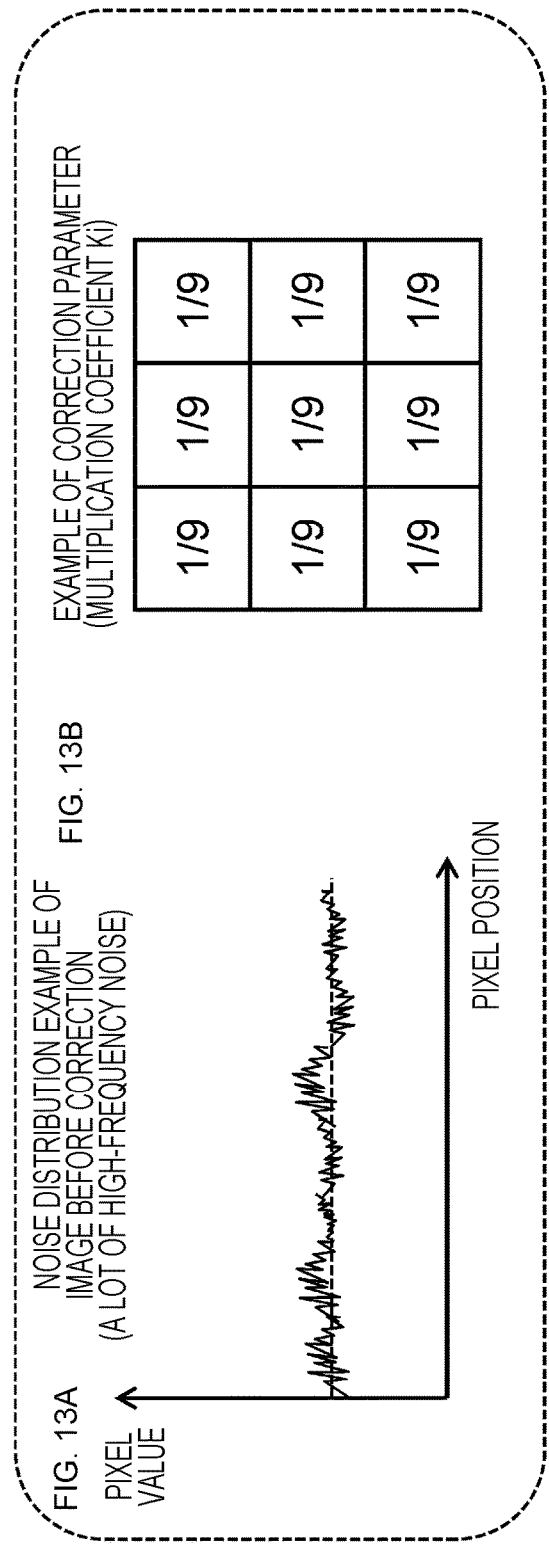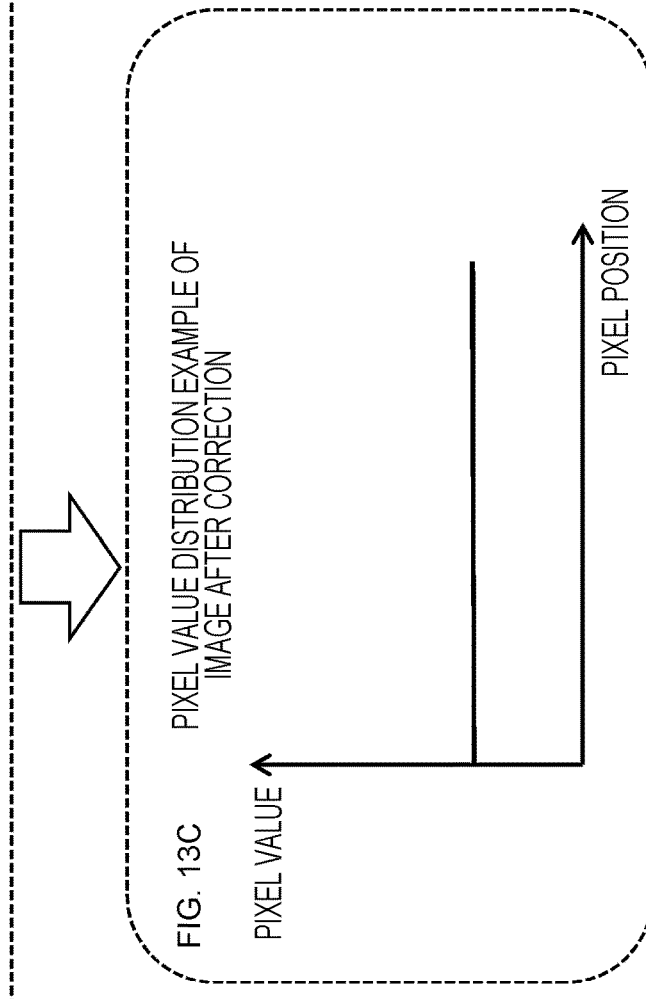

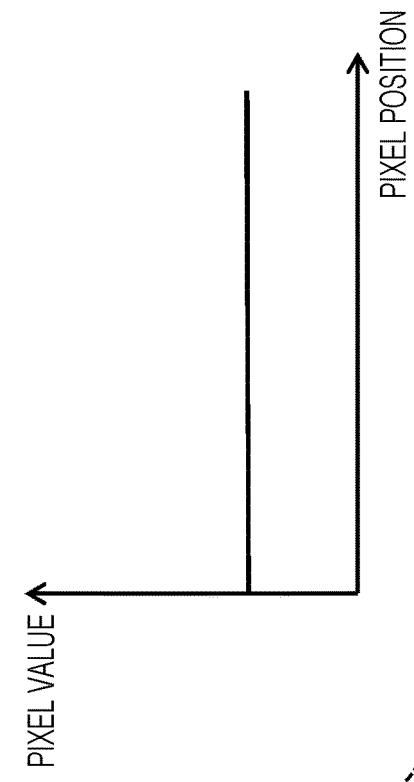

IMAGE PROCESSING DEVICE, IMAGING DEVICE, AND IMAGE PROCESSING METHOD

CROSS REFERENCE TO RELATED APPLICATIONS

This application is a U.S. National Phase of International Patent Application No. PCT/JP2017/002582 filed on Jan. 25, 2017, which claims priority benefit of Japanese Patent Application No. JP 2016-065532 filed in the Japan Patent Office on Mar. 29, 2016. Each of the above-referenced applications is hereby incorporated herein by reference in its entirety.

TECHNICAL FIELD

The present disclosure relates to an image processing device, an imaging device, an image processing method, and a program. More particularly, the present disclosure relates to an image processing device, an imaging device, an image processing method, and a program for performing image processing of a visible light image and an infrared light image.

BACKGROUND ART

Recently, systems in which an infrared light camera capable of capturing a person or other objects even in the nighttime or other situations where it is difficult to capture an image by visible light is combined with a visible light camera that captures an image of visible light are widely used.

An imaging device using such two cameras is disclosed in, for example, Patent Document 1 (JP 2011-211387 A).

However, in general, there is a problem that infrared light cameras have lower resolution as compared to that of a visible light camera which performs imaging with visible light.

CITATION LIST

Patent Document

Patent Document 1: Japanese Patent Application Laid-Open No. 2011-211387

SUMMARY OF THE INVENTION

Problems to be Solved by the Invention

The present disclosure has been made in view of the above problems for example, and an object of one embodiment of the present disclosure is to provide an image processing device, an imaging device, and an image processing method, and a program for implementing higher image quality of a captured image of an infrared light camera.

Furthermore, in an embodiment of the present disclosure, an object of the present invention is to provide an image processing device, an imaging device, an image processing method, and a program for performing an image quality improvement processing for both a visible light image and an infrared light image.

Solutions to Problems

A first aspect of the present disclosure is an image processing device, including:

a feature amount calculating unit for receiving an infrared light image and a visible light image and extracting a feature amount from at least one of the images; and an image correcting unit for executing pixel value correction processing on the infrared light image on the basis of a reference area and a correction parameter determined depending on the feature amount.

Furthermore, a second aspect of the present disclosure is an imaging device, including:

an infrared light image imaging unit for performing imaging processing of an infrared light image;

a visible light image imaging unit for performing imaging processing of a visible light image; and an image processing unit for receiving the infrared light image and the visible light image and executing pixel value correction processing of at least one of the images, in which the image processing unit includes: a feature amount calculating unit for receiving the infrared light image and the visible light image and extracting a feature amount from at least one of the images; and an image correcting unit for executing pixel value correction processing on the infrared light image on the basis of a reference area and a correction parameter determined depending on the feature amount.

Furthermore, a third aspect of the present disclosure is an image processing device, including:

a feature amount calculating unit for receiving an infrared light image and extracting a feature amount; and an image correcting unit for executing pixel value correction processing on the infrared light image on the basis of a reference area and a correction parameter determined depending on the feature amount.

Furthermore, a fourth aspect of the present disclosure is an image processing method executed in an image processing device, including:

a feature amount calculating step of receiving, by a feature amount calculating unit, an infrared light image and a visible light image and extracting a feature amount from at least one of the images; and an image correcting step of executing, by an image correcting unit, pixel value correction processing on the infrared light image on the basis of a reference area and a correction parameter determined depending on the feature amount.

Furthermore, a fifth aspect of the present disclosure is a program for causing an image processing device to execute image processing. The program causes a feature amount calculating unit to receive an infrared light image and a visible light image and to extract a feature amount from at least one of the images, and the program causes an image correcting unit to execute pixel value correction processing on the infrared light image on the basis of a reference area and a correction parameter determined depending on the feature amount.

Note that the program of the present disclosure is provided in a computer readable format to an information processing device or a computer system that can execute various program codes, for example, and allows for provision by a storage medium or a communication medium. By providing such a program in a computer readable format, processing according to the program is implemented on the information processing device or the computer system.

Other objects, features, or advantages of the present disclosure will become clear from further detailed descriptions based on embodiments or accompanying drawings of the present disclosure which will be described later. Note that in this specification, the term "system" refers to a logical group configuration of a plurality of devices, and is not limited to those in which devices of respective components are in the same housing.

Effects of the Invention

According to a configuration of an embodiment of the present disclosure, a device and a method for executing image quality improvement processing of an infrared light image are implemented.

Specifically, included are: a feature amount calculating unit for receiving an infrared light image and a visible light image and extracting a feature amount from at least one of the images; and an image correcting unit for executing pixel value correction processing on the infrared light image on the basis of a reference area and a correction parameter determined depending on the feature amount. Further included are: a tap selection unit for determining the reference area used for the pixel value correction on the basis of the feature amount; and a correction parameter calculating unit for determining the correction parameter used for the pixel value correction on the basis of the feature amount. The image correcting unit executes the pixel value correction processing in which a tap determined by the tap selection unit and the correction parameter determined by the correction parameter calculating unit are applied.

By these flows of processing, a device and a method for executing image quality improvement processing of an infrared light image are implemented.

Note that effects described herein are merely examples and thus are not limiting. Additional effects may also be further included.

BRIEF DESCRIPTION OF DRAWINGS

FIGS. 2A and 2B are diagrams explaining an example of pixel arrays of a visible light image and an infrared light image.

FIGS. 6A1 6A2, 6B1, 6B2, 6C1, and 6C2 are diagrams explaining types and specific examples of feature amounts.

FIG. 7 is a diagram explaining the configuration and processing of the image processing unit that executes image correction processing in the case where luminance distribution information is used as a feature amount.

FIGS. 8A, 8B, and 8C are diagrams explaining an example of image correction processing in the case where luminance distribution information is used as a feature amount.

FIGS. 11A, 11B, and 11C are diagrams explaining an example of image correction processing in the case where PSF information indicating a blur mode is used as a feature amount.

FIGS. 13A, 13B, and 13C are diagrams explaining an example of image correction processing in the case where noise information is used as a feature amount.

FIGS. 14A, 14B, and 14C are diagrams explaining an example of image correction processing in the case where noise information is used as a feature amount.

MODE FOR CARRYING OUT THE INVENTION

Figure 1:
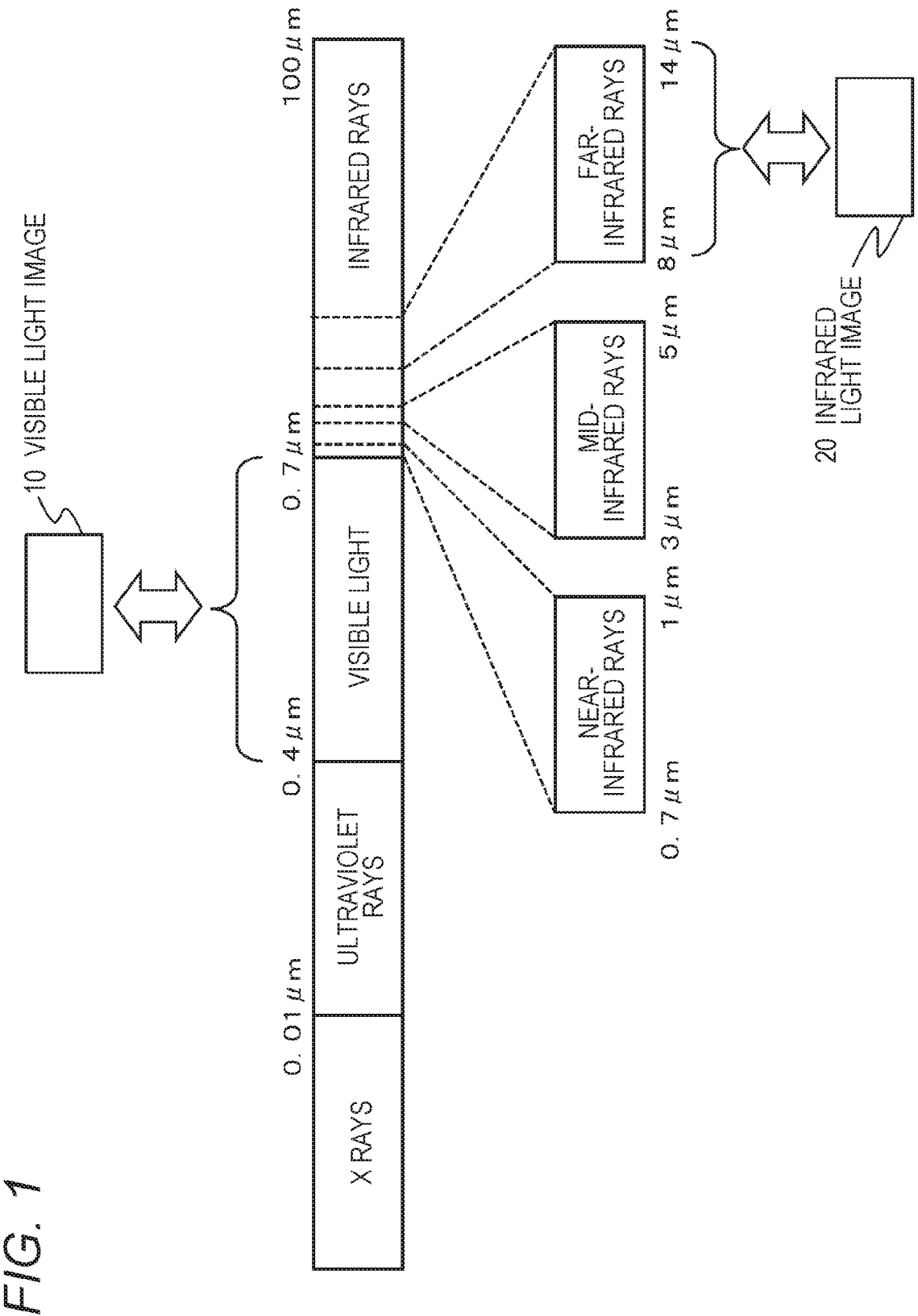
FIG. 1 is a diagram explaining a correspondence relationship between types of captured images and wavelengths of light.

Details of an image processing device, an imaging device, an image processing method, and a program of the present disclosure will be described below with reference to the drawings. Note that explanations will be given along the following items.

1. Configuration and processing of image processing device of the present disclosure
2. Image processing device for executing image quality improvement processing of infrared light image
2-1. Exemplary processing of generating high quality image by image correction processing using luminance distribution information as image feature amount
2-2. Exemplary processing of generating high quality image by image correction processing using point spread function (PSF) (=function indicating blur mode) as image feature amount
2-3. Exemplary processing of generating high quality image by image correction processing using noise information as image feature amount
3. Exemplary configuration of performing image quality improvement processing of visible light image
4. Other embodiments of image processing device
4-1. Embodiment in which reduced image of captured image is generated and image processing is executed on reduced image
4-2. Embodiment in which pseudo-infrared light image based on visible light image is generated and parallax amount and motion information is calculated using captured infrared light image and pseudo-infrared light image
4-3. Embodiment in which corrected infrared light image generated by image correcting unit is fed back and reused
4-4. Embodiment in which only infrared light image is used without using visible light image 5. Sequence of processing executed by image processing device 6. Example of hardware configuration of image processing device 7. Summary of configurations of the present disclosure

[1. Configuration and Processing of Image Processing Device of the Present Disclosure]

A configuration and processing of an image processing device of the present disclosure will be described with reference to FIG. 1 and the subsequent drawings.

First, an image to be processed by the image processing device of the present disclosure will be described with reference to FIG. 1 and the subsequent drawings.

The image processing device of the present disclosure receives a visible light image and an infrared light image and executes image processing to which these images are applied.

As illustrated in FIG. 1, a visible light image 10 is an image having a wavelength in the range of about 0.4 µm to 0.7 µm, and is a color image such as an RGB image captured by a general camera.

An infrared light image is an image of long wavelength light having a wavelength of 0.7 µm or more. An infrared light image imaging camera for capturing an infrared light image is capable of capturing a person or other objects generating heat in darkness or the like, for example, and is used for a surveillance camera or other cameras.

Note that, as illustrated in FIG. 1, infrared rays are classified into near-infrared rays having a wavelength of about 0.7 to 1 µm, mid-infrared rays having a wavelength of about 3 to 5 µm, and far-infrared rays having a wavelength of about 8 to 14 µm.

In an embodiment to be described below, an example of image processing using an infrared light image 20 capturing mainly far-infrared rays having a wavelength of about 8 to 14 µm will be described.

However, the processing according to the present disclosure is applicable not only to far-infrared light images but also to processing using other infrared light images.

FIGS. 2A and 2B are diagrams illustrating an example of pixel arrays on imaging elements that capture the visible light image 10 and the infrared light image 20.

A visible light image of FIG. 2A illustrates an example of a Bayer array including RGB pixels. This Bayer array is used for imaging elements of many visible light imaging cameras.

Each pixel of the imaging element outputs an electric signal corresponding to the amount of light having one of the wavelengths of R, G, and B.

On the other hand, a far-infrared light image of FIG. 2B captures light having a wavelength of far infrared light (FIR) at all pixel positions.

However, as illustrated in FIGS. 2A and 2B, in general, infrared light image imaging elements have a lower resolution than that of visible light image imaging elements. This is because, for example, infrared light, especially far-infrared light, has long wavelength, and thus it is difficult to use an imaging element having a high-density pixel array.

One example of processing executed by the image processing device of the present disclosure will be described with reference to FIG. 3. The image processing device of the present disclosure executes image processing on an infrared light image having a low resolution and generates a far-infrared light image having a high resolution, for example.

Figure 3:
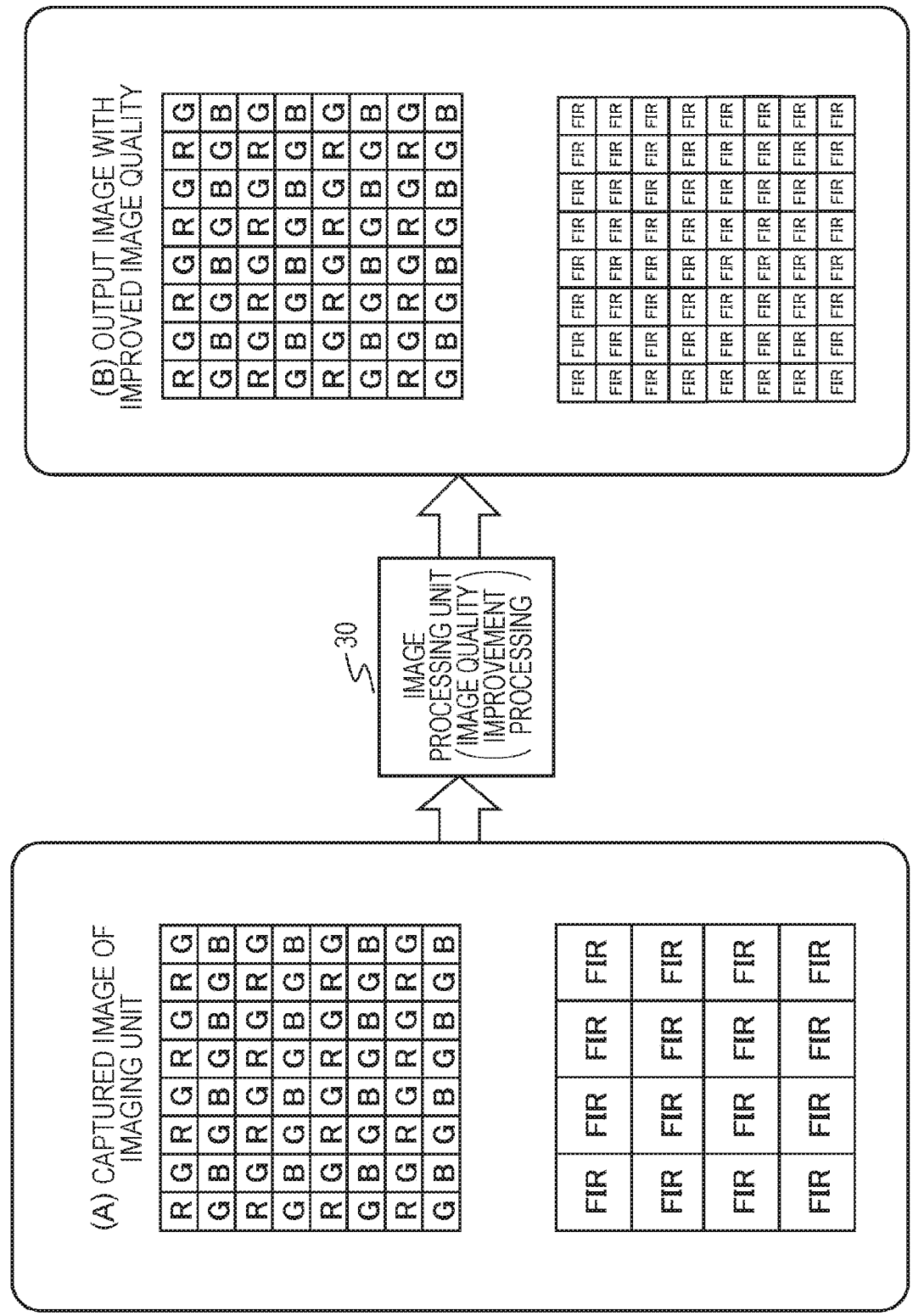
FIG. 3 is a diagram explaining processing executed by an image processing device according to the present disclosure.

As illustrated in FIG. 3, an image processing unit 30 of the image processing device according to the present disclosure inputs a high-resolution visible light image and a low-resolution far-infrared light image as (A) captured images of an imaging unit.

Using these two input images, the image processing unit 30 executes image quality improvement processing on the far-infrared light image having a low resolution, and generates and outputs an image-quality enhanced image as illustrated in (B), that is, at least one of a high-resolution visible light image and a high-resolution far-infrared light image.

Hereinafter, a specific configuration and processing of the image processing device that executes such image processing will be described.

[2. Image Processing Device for Executing Image Quality Improvement Processing of Infrared Light Image]

Figure 4:
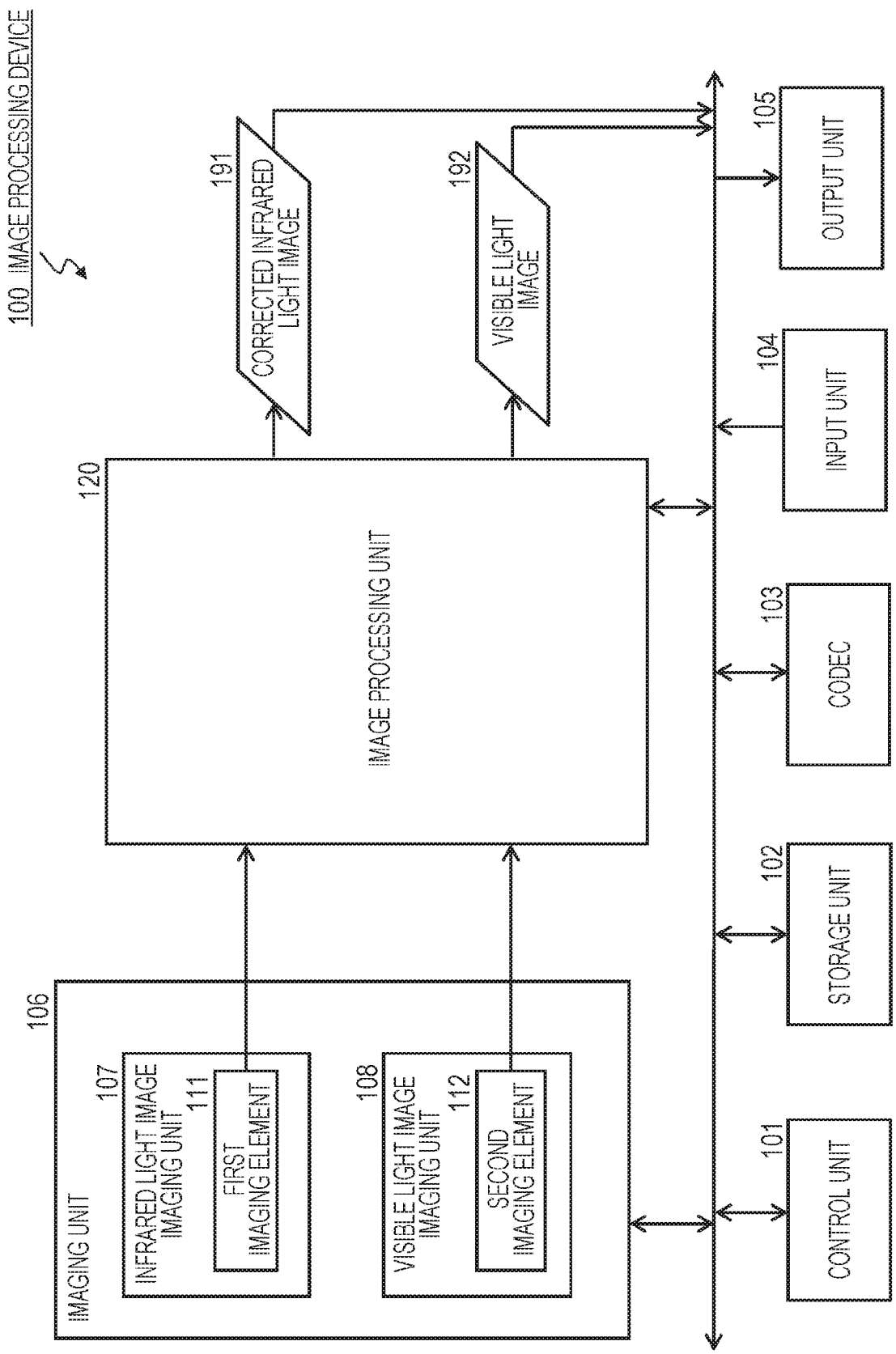
FIG. 4 is a diagram explaining a configuration example of the image processing device.

FIG. 4 is a block diagram illustrating a configuration of an imaging device which is an example of the image processing device 100 of the present disclosure.

Note that the image processing device according to the present disclosure is not limited to imaging devices but also includes information processing devices such as a PC that executes image processing by inputting a captured image of an imaging device, for example.

In the following, a configuration and processing of the imaging device will be described as an example of the image processing device 100 of the present disclosure.

Image processing other than imaging processing described in the following embodiments is not limited to imaging devices and can be executed in an information processing device such as a PC.

The image processing device 100 as the imaging device illustrated in FIG. 4 includes a control unit 101, a storage unit 102, a codec 103, an input unit 104, an output unit 105, an imaging unit 106, and an image processing unit 120.

The imaging unit 106 includes an infrared light image imaging unit 107 that captures a far-infrared light image and a visible light image imaging unit 108 that captures a normal visible light image.

The infrared light image imaging unit 107 has a first imaging element 111 for capturing a far-infrared light image. The first imaging element 111 is an imaging element including pixels on which far-infrared light is incident as described above with reference to FIG. 2B for example, and outputs an electric signal corresponding to the amount of far-infrared light incident thereon.

On the other hand, the visible light image imaging unit 108 has a second imaging element 112 for capturing a visible light image. The second imaging element 112 has the RGB pixels including the Bayer array described above with reference to FIG. 2A for example, and outputs a signal corresponding to input light of each of the colors of R, G, and B for each of the pixels.

The infrared light image imaging unit 107 and the visible light image imaging unit 108 are two imaging units set at positions a predetermined distance apart from each other, and thus captured images thereof are captured from different viewpoints.

The same subject image is not captured in corresponding pixels, that is, pixels at the same position, of the two images from different viewpoints, and a subject shift corresponding to the parallax occurs.

In a case where the captured images are still images, the infrared light image imaging unit 107 and the visible light image imaging unit 108 each capture one still image, which totals two. In a case where video is taken, as a capturing frame of each of the imaging units, each of the imaging units captures continuous image frames.

Note that control of the shooting timing is performed by the control unit 101.

The control unit 101 controls various types of processing to be executed in the imaging device, such as capturing an image, signal processing on captured images, image recording processing, and display processing. The control unit 101 includes a CPU or other components that executes processing according to various processing programs stored in the storage unit 102, for example, and functions as a data processing unit that executes the programs.

The storage unit 102 includes a storage unit of captured images and a storage unit for a processing program executed by the control unit 101 and various parameters, as well as a RAM, a ROM, and the like that function as a work area at the time of data processing.

The codec 103 executes encoding and decoding processing such as compression and decompression processing of a captured image.

The input unit 104 is, for example, a user operation unit, and receives control information such as start or end of imaging, and various mode settings.

The output unit 105 includes a display unit, a speaker, and the like and is used for displaying a captured image, a through image, etc., audio output, and the like.

The image processing unit 120 receives two images input from the imaging unit 106 and executes image quality improvement processing of the input images by applying these two images.

Specifically, for example, a corrected infrared light image 191 with improved image quality is generated. Note that an object of the image quality improvement processing is only the infrared light image in this embodiment, and no image quality improvement processing is executed on the visible light image. A visible light image 192 corresponds to the captured visible light image.

Note that it is also possible to perform image quality improvement processing on a visible light image, and such embodiment will be described later.

A configuration and processing of the image processing unit 120 will be described with reference to FIG. 5 and the subsequent drawings.

In the present embodiment, the image processing unit 120 receives two types of images of an infrared light image 201 captured by the infrared light image imaging unit 107 and a visible light image 202 captured by the visible light image imaging unit 108, and generates and outputs a corrected infrared light image 205 applied with image quality improvement processing using these two types of images.

Processing executed by the image processing unit 120 will be described.

The image processing unit 120 inputs the infrared light image 201 captured by the infrared light image imaging unit 107 to a scaler 121 and executes scaling processing of matching the size of the infrared light image 201 to the size of the visible light image 202.

This is adjustment processing of image sizes for eliminating the difference between the size of the first imaging element 111 of the infrared light image imaging unit 107 and the size of the second imaging element of the visible light image imaging unit 108.

In most cases, the size of the first imaging element 111 of the infrared light image imaging unit 107 is smaller than the size of the second imaging element of the visible light image imaging unit 108.

The scaler 121 executes scaling processing of matching the size of the infrared light image 201 to the size of the visible light image 202.

The infrared light image 201 and the visible light image 202 sizes of which are matched are input to a parallax amount detection & motion detection unit 122 and an image position matching unit 123.

The parallax amount detection & motion detection unit 122 detects the parallax amount of the infrared light image 201 and the visible light image 202 and the motion amount between the two images.

The infrared light image imaging unit 107 and the visible light image imaging unit 108 are two imaging units set at positions a predetermined distance apart from each other, and thus captured images thereof (the infrared light image 201 and the visible light image 202) are captured from different viewpoints.

The same subject image is not captured in corresponding pixels, that is, pixels at the same position, of the two images from different viewpoints, namely, the infrared light image 201 and the visible light image 202, and a subject shift corresponding to the parallax occurs.

Furthermore, in a case where these two images are not shot at perfectly the same timing and the subject includes a moving subject, positions of the same subject captured in the respective images are different. That is, there is a motion amount of the subject.

The parallax amount detection & motion detection unit 122 detects the parallax amount between the infrared light image 201 and the visible light image 202 and the motion amount between the two images, and inputs these pieces of information, namely, parallax information and motion information, for example a motion vector (MV), to the image position matching unit 123.

The image position matching unit 123 executes position matching processing of the infrared light image 201 having been subjected to the size adjustment and the visible light image 202 using the parallax information and the motion information input from the parallax amount detection & motion detection unit 122.

That is, the position matching processing of the two images is executed such that the same subject is located at the same position in each image.

Note that, specifically, processing of matching a subject position of the infrared light image 201 with a subject position of the visible light image 202 is performed for example by using the visible light image 202 as a reference position without moving the subject position of the visible light image 202.

However, which image to use as a reference image is not limited, and either one of the images can be used as a reference image.

Figure 5:
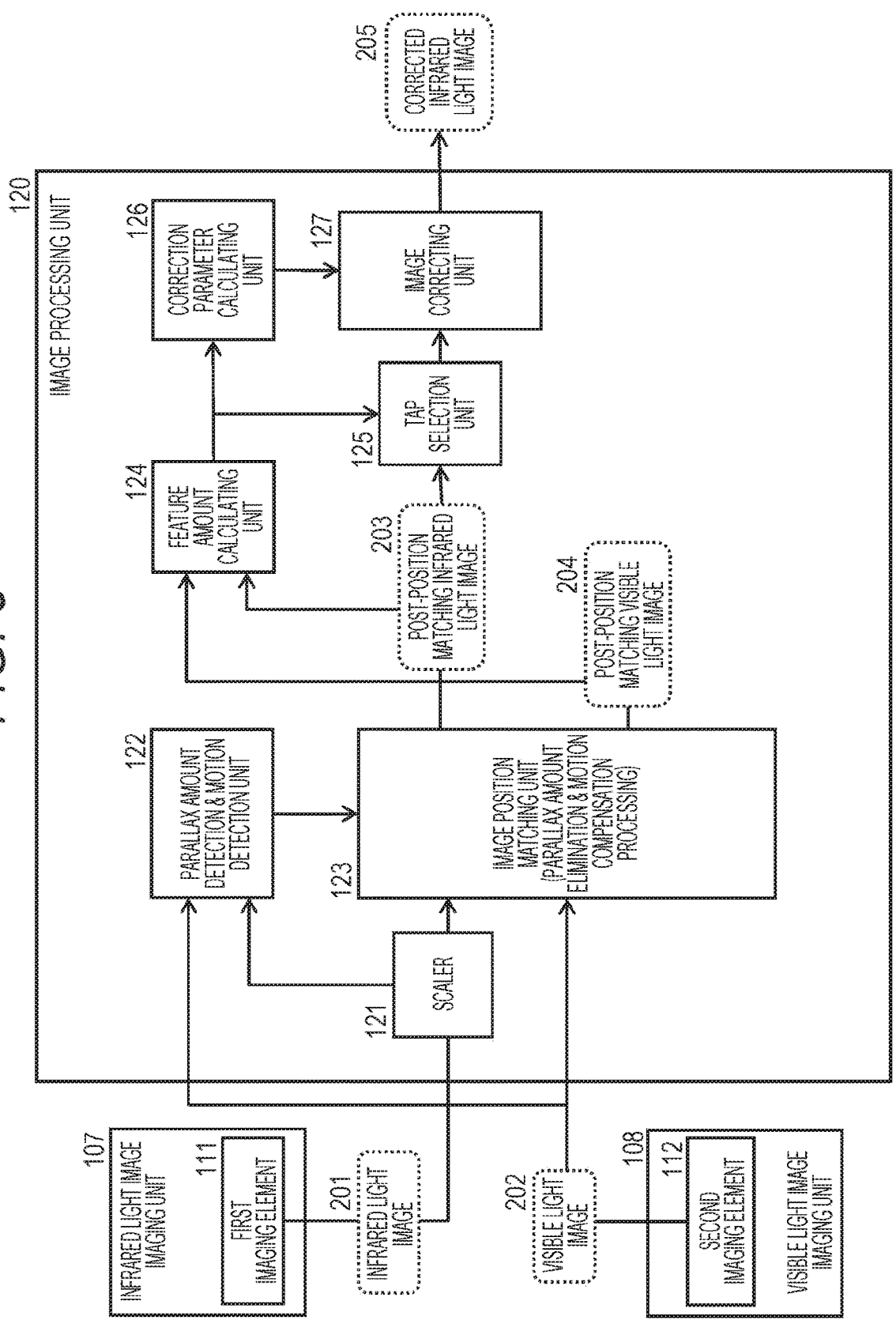
FIG. 5 is a diagram explaining the configuration and processing of an image processing unit.

The image position matching unit 123 outputs two images after the position matching, that is, a post-position matching infrared light image 203 and a post-position matching visible light image 204 illustrated in FIG. 5 to a feature amount calculating unit 124.

The post-position matching infrared light image 203 is further input to an image correcting unit 127 via a tap selection unit 125.

The feature amount calculating unit 124 receives the post-position matching infrared light image 203 and the post-position matching visible light image 204, extracts the feature amount of images from these images, and outputs the extracted feature amount data to the tap selection unit 125 and a correction parameter calculating unit 126.

An example of feature amount data acquired by the feature amount calculating unit 124 from the post-position matching infrared light image 203 and the post-position matching visible light image 204 will be described with reference to FIGS. 6A1, 6A2, 6B1, 6B2, 6C1, and 6C2.

FIGS. 6A1, 6A2, 6B1, 6B2, 6C1, and 6C2 illustrate an example of the following three types of image feature amounts that the feature amount calculating unit 124 can extract from at least one of the two images.

FIG. 6A Luminance distribution information
FIG. 6B Point spread function (PSF) (=function indicating a blur mode)
FIG. 6C Noise information "FIG. 6A Luminance distribution information" is distribution information of luminance values of respective pixels in an image. In the specific example of FIG. 6A2, a graph (luminance distribution graph) in which the pixel position is set on the horizontal axis and luminance values are set on the vertical axis is illustrated.

In the example illustrated in the figure, the left side of the graph contains low luminance values while the right side contains high luminance values. Such a luminance distribution corresponds to an edge region such as a boundary of a subject, for example.

Note that such luminance distribution information is an image feature amount that can be acquired from only one of the post-position matching infrared light image 203 and the post-position matching visible light image 204.

"FIG. 6B Point spread function (PSF) (=function indicating a blur mode)" is a point spread function (PSF) which is a function indicating the blur amount of an image.

As illustrated in a specific example of FIG. 6B2, a PSF is a function illustrating the degree of a spread of a pixel value at a certain pixel position to the surroundings thereof, that is, the blur amount.

Note that such a point spread function is also an image feature amount that can be acquired from only one of the post-position matching infrared light image 203 and the post-position matching visible light image 204.

"FIG. 6C Noise information" is information indicating noise included in an image. An image captured by a camera contains some noise.

In the specific example of FIG. 6C2, a graph (noise distribution graph) in which the pixel position is set on the horizontal axis and pixel values are set on the vertical axis is illustrated.

As illustrated in this graph, a pixel value is obtained by adding a predetermined amount of noise to the original color or luminance of the subject. Note that noise includes various types of noise such as high frequency noise and low frequency noise.

Note that such noise information is also an image feature amount that can be acquired from only one of the post-position matching infrared light image 203 and the post-position matching visible light image 204.

These three image feature amounts illustrated in FIGS. 6A1, 6A2, 6B1, 6B2, 6C1, and 6C2 are examples of feature amount data acquired by the feature amount calculating unit 124 from at least one of the post-position matching infrared light image 203 and the post-position matching visible light image 204.

The feature amount calculating unit 124 acquires at least one of the three image feature amounts illustrated in FIGS. 6A1, 6A2, 6B1, 6B2, 6C1, and 6C2 from at least one of the post-position matching infrared light image 203 and the post-position matching visible light image 204.

On the basis of the acquired feature amount, the image correcting unit 127 executes image correction processing as image quality improvement processing on the post-position matching infrared light image 203 and generates and outputs a corrected infrared light image 205 with improved image quality.

The tap selection unit 125, the correction parameter calculating unit 126, and the image correcting unit 127 illustrated in FIG. 5 execute tap setting processing and correction parameter calculating processing to be applied to image correction processing for improving the image quality of the post-position matching infrared light image 203 on the basis of the image feature amount calculated by the feature amount calculating unit 124 as well as the image correction processing.

Hereinafter, specific processing examples of image correction processing in which the three feature amounts illustrated in FIGS. 6A1, 6A2, 6B1, 6B2, 6C1, and 6C2, that is:

FIG. 6A Luminance distribution information;
FIG. 6B Point spread function (PSF) (=function indicating a blur mode); and
FIG. 6C Noise information
are individually applied, that is, image quality improvement processing of infrared light image will be described in order.

[2-1. Exemplary Processing of Generating High Quality Image by Image Correction Processing Using Luminance Distribution Information as Image Feature Amount]

First, a processing example in which luminance distribution information is acquired as an image feature amount and image quality improvement processing of an infrared light image is performed by image correction processing using the acquired luminance distribution information will be described.

FIG. 7 is a diagram illustrating a configuration similar to that of the image processing unit 120 described with reference to FIG. 5.

A feature amount extracting unit 124 extracts luminance distribution information as an image feature amount, a tap selection unit 125, a correction parameter calculating unit 126, and an image correcting unit 127 execute tap setting processing and correction parameter calculating processing to be applied to image correction processing for improving the image quality of a post-position matching infrared light image 203 on the basis of the luminance distribution information extracted by the feature amount extracting unit 124 as well as the image correction processing.

FIG. 7 illustrates respective processing executed by the feature amount extracting unit 124, the tap selection unit 125, the correction parameter calculating unit 126, and the image correcting unit 127.

As illustrated in FIG. 7, the feature amount extracting unit 124 acquires the luminance distribution information as an image feature amount from the post-position matching infrared light image 203 and a post-position matching visible light image 204 in step S101.

As described above with reference to FIG. 6A, the luminance distribution information is distribution information of luminance values of respective pixels in an image. For example, the luminance distribution information includes luminance information corresponding to pixels that corresponds to a luminance distribution graph as illustrated in FIG. 6A2.

The luminance distribution information extracted by the feature amount extracting unit 124 from the post-position matching infrared light image 203 and the post-position matching visible light image 204 is input to the tap selection unit 125 and the correction parameter calculating unit 126.

In step S102, the tap selection unit 125 executes, on the basis of the luminance distribution information extracted by the feature amount extracting unit 124 from the post-position matching infrared light image 203 and the post-position matching visible light image 204, reference pixel area selecting processing to be applied to correction processing, that is, tap selection processing.

In addition, in step S103, the correction parameter calculating unit 126 calculates, on the basis of the luminance distribution information extracted by the feature amount extracting unit 124 from the post-position matching infrared light image 203 and the post-position matching visible light image 204, a correction parameter to be applied to correction processing. For example, a multiplication coefficient to be applied to reference pixels surrounding the current correction pixel is calculated.

An example of the tap selection processing in the tap selection unit 125 and the calculation processing of the correction parameter in the correction parameter calculating unit 126 will be described with reference to FIGS. 8A, 8B, and 8C.

FIGS. 8A, 8B, and 8C illustrates the following drawings.

FIG. 8A Luminance distribution example of image before correction FIG. 8B Example of tap settings and correction parameter (multiplication coefficient Ki)

FIG. 8C Luminance distribution example of image after correction.

(a1) In the luminance distribution example of an image before correction, a luminance distribution example of a visible light image and a luminance distribution example of an infrared light image are illustrated. Since the visible light image has been captured by a second imaging element 112 having a high density pixel configuration arranged in a visible light image imaging unit 108 and is a high resolution image, the luminance distribution reflects the luminance of a subject more accurately.

On the other hand, the infrared light image has been captured by a first imaging element 111 having a low density pixel configuration arranged in an infrared light image imaging unit 107 and is also a low resolution image that has been subjected to enlargement processing by a scaler 121, and thus the luminance distribution is gentle without accurately reflecting the luminance of the subject. That is, the infrared light image is blurred with a low resolution.

The tap selection unit 125 performs tap selection for performing image correction in which the resolution level is improved by correcting such low-resolution infrared light image. Specifically, a range of the reference pixels to be applied to the correction processing of pixel values of pixels to be corrected is set.

The tap selection unit 125 determines a reference area to be used for pixel value correction in the image correcting unit 127 on the basis of the feature amount input from the feature amount extracting unit 124.

Specifically, for example, a wider reference pixel area (tap area) is set as a shift in the luminance distribution information extracted from the post-position matching infrared light image 203 and the post-position matching visible light image 204 is larger.

Furthermore, the correction parameter calculating unit 126 calculates a correction parameter to be applied to the correction processing of pixel values of the pixels to be corrected. Specifically, a multiplication coefficient $K_i$ to multiply pixel values of reference pixels is calculated.

The correction parameter calculating unit 126 determines a correction parameter to be used for pixel value correction in the image correcting unit 127 on the basis of a feature amount input from the feature amount extracting unit 124.

Specifically, for example, depending on the state of the shift in the luminance distribution information extracted from the post-position matching infrared light image 203 and the post-position matching visible light image 204, an effective correction parameter for eliminating the shift is determined.

In "FIG. 8B Example of tap settings and correction parameter (multiplication coefficient Ki)" in FIG. 8, with a pixel to be corrected arranged in the center, positions of surrounding reference pixels used for correction of a pixel value of the current correction pixel and values of the multiplication coefficient Ki for each of the reference pixels are illustrated.

In the example illustrated in the drawing, 3×3=9 pixels centered at the current correction pixel are illustrated. Values 0, 1, −1 illustrated in the nine pixel positions are the multiplication coefficient Ki that is the correction parameter calculated by the correction parameter calculating unit 126. Note that i is a pixel position identifier indicating a pixel position.

The tap selection unit 125 selects a pixel position referred to for calculating a corrected pixel value of the current correction pixel as the tap position. In the example illustrated in the figure, pixel positions set with 1 or −1 are taps.

The correction parameter calculating unit 126 calculates a multiplication coefficient Ki to multiply pixel values at tap positions. These are −1 and 1 illustrated in FIG. 8B.

The selection tap information set by the tap selection unit 125, that is, the reference pixel position information and the correction parameter calculated by the correction parameter calculating unit 126, that is, the multiplication coefficient $K_i$ for a pixel value of each reference pixel position are input to the image correcting unit 127.

The image correcting unit 127 calculates a corrected pixel value of the current correction pixel on the basis of these input values. Specifically, a corrected pixel value T of the current correction pixel is calculated by application of the following equation for corrected pixel value calculation (equation 1) illustrated in step S104 in FIG. 7.

The corrected pixel value T is calculated from the following (equation 1).

[Mathematical Formula 1]

$$T = \sum_{i=0}^{n} Ki \times Ti \qquad \text{(Equation 1)}$$

Note that in the above equation (1), respective symbols have the following meanings.

T: Corrected pixel value of current correction pixel
$T_i$: pixel value of reference pixel
i: pixel identifier of reference pixel
$K_i$: Multiplication coefficient corresponding to reference pixel i The current correction pixel is, for example, a pixel at the central position out of the 3×3=9 pixels illustrated in FIG. 8B.

Reference pixels are respective pixels of the 3×3=9 pixels, and Ti represent a pixel value of each of these pixels. Symbol i is an identifier of a pixel. In the case of referring to the nine pixels, n=8 is set, and a corrected pixel value T is calculated using pixel values of the respective pixels of i=0 to 8.

Symbol Ki represents a multiplication coefficient for a pixel value Ti set to each pixel position i.

A pixel value of the current correction pixel is calculated from the above (equation 1).

Note that the tap settings and settings of the correction parameter (multiplication coefficient) illustrated in FIG. 8B are merely examples, and settings of taps and a correction parameter are changed to various settings depending on a feature amount.

The image correcting unit 127 sequentially calculates corrected pixel values of all of the pixels included in the post-position matching infrared light image 203 from the above (equation 1) and generates and outputs a corrected infrared light image 205 thereby calculated.

A luminance distribution example of the corrected infrared light image 205 is illustrated in FIG. 8C.

The luminance distribution of the corrected infrared light image 205 has a shape closer to the luminance distribution of the visible light image as compared with the luminance distribution of the infrared light image before the correction illustrated in FIG. 8A. In other words, the distribution has improved resolution.

This is a result of performing pixel value correction for reflecting the feature amount, that is, the luminance distribution of the visible light image with high resolution on pixel values of the infrared light image with low resolution.

In this manner, correcting pixel values of the infrared light image using luminance distribution information which is a feature amount of the visible light image with high resolution enables improvement of the image quality of the infrared light image with low resolution. In other words, it becomes possible to generate and output the corrected infrared light image 205 with an improved resolution.

[2-2. Exemplary Processing of Generating High Quality Image by Image Correction Processing Using Point Spread Function (PSF) (=Function Indicating Blur Mode) as Image Feature Amount]

Next, an example of processing of performing an image quality improvement processing of an infrared light image by acquiring the point spread function (PSF) (=function indicating a mode indicating a blur mode) as an image feature amount and performing image correction processing using the acquired point spread function (PSF) information will be described.

Figure 9:
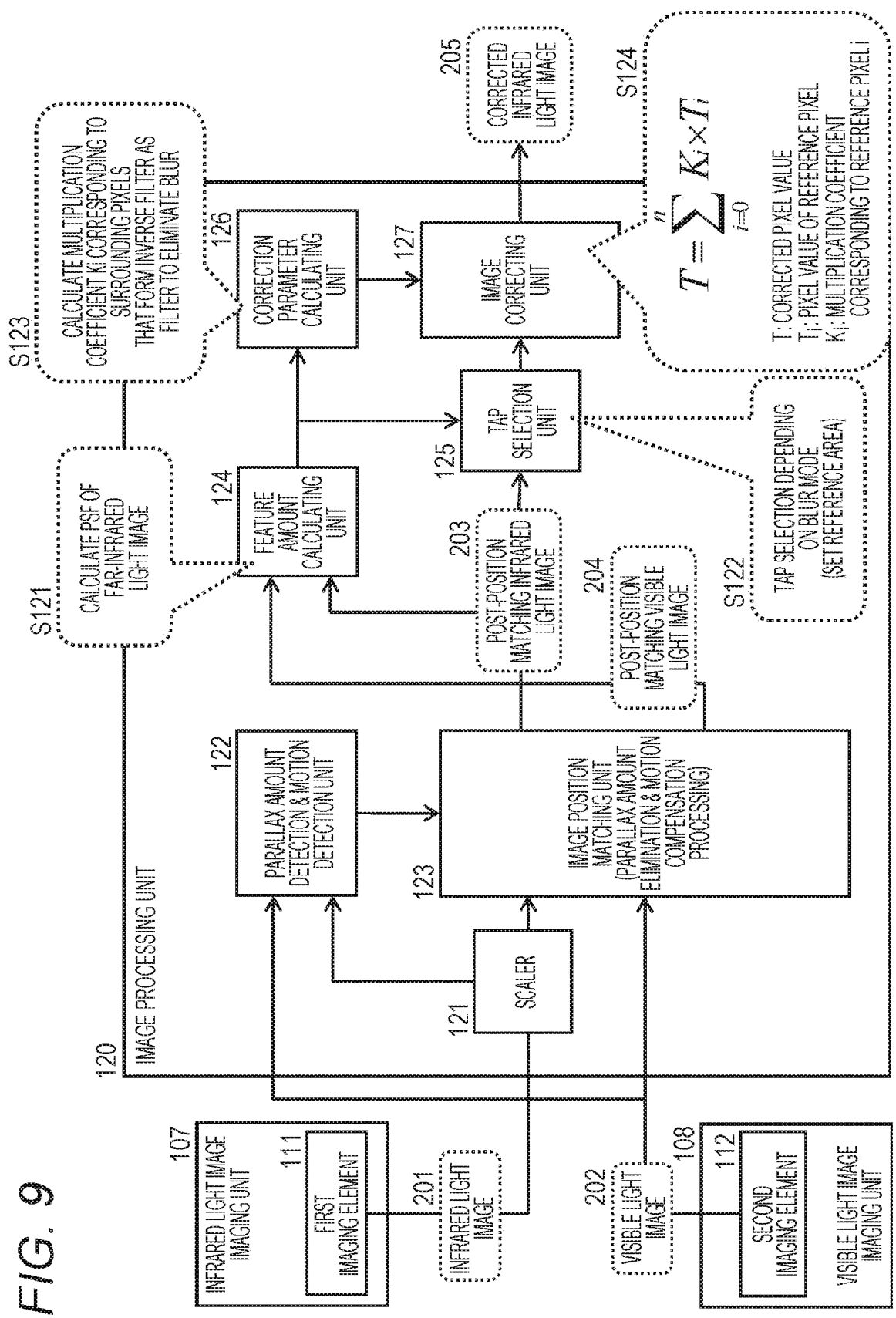
FIG. 9 is a diagram explaining the configuration and processing of the image processing unit that executes image correction processing in the case where PSF information indicating a blur mode is used as a feature amount.

Like FIG. 7, FIG. 9 is a diagram illustrating a configuration similar to that of the image processing unit 120 described with reference to FIG. 5.

A feature amount extracting unit 124 extracts a point spread function (PSF) (=function indicating a mode indicating a blur mode) as an image feature amount from a post-position matching infrared light image 203 and outputs the PSF function to a tap selection unit 125 and a correction parameter calculating unit 126.

The tap selection unit 125, the correction parameter calculating unit 126, and an image correcting unit 127 execute tap setting processing and correction parameter calculating processing to be applied to image correction processing for improving the image quality of the post-position matching infrared light image 203 on the basis of the point spread function (PSF) (=function indicating a mode indicating a blur mode) extracted by the feature amount extracting unit 124 from the post-position matching infrared light image 203 as well as the image correction processing.

FIG. 9 illustrates respective processing executed by the feature amount extracting unit 124, the tap selection unit 125, the correction parameter calculating unit 126, and the image correcting unit 127.

As illustrated in FIG. 9, in step S121, the feature amount extracting unit 124 acquires a point spread function (PSF) (=function indicating a mode indicating a blur mode) as an image feature amount from the post-position matching infrared light image 203.

The point spread function (PSF) (=function indicating the blur mode) is a function indicating the blur amount of an image as described above with reference to FIG. 6B.

As illustrated in a specific example of FIG. 6B2, a PSF is a function illustrating the degree of a spread of a pixel value at a certain pixel position to the surroundings thereof, that is, the blur amount.

Note that in this case the point spread function (PSF) is acquired using the post-position matching infrared light image 203.

The point spread function (PSF) information extracted from the post-position matching infrared light image 203 by the feature amount extracting unit 124 is input to the tap selection unit 125 and the correction parameter calculating unit 126.

In step S122, the tap selection unit 125 executes, on the basis of the point spread function (PSF) information extracted by the feature amount extracting unit 124 from the post-position matching infrared light image 203, reference pixel area selecting processing to be applied to correction processing, that is, tap selection processing.

Specifically, for example, a wider reference pixel area (tap area) is set as a blur amount in the post-position matching infrared light image 203 is larger.

In addition, in step S123, the correction parameter calculating unit 126 calculates, on the basis of the point spread function (PSF) information extracted by the feature amount extracting unit 124 from the post-position matching infrared light image 203, a correction parameter to be applied to correction processing.

Specifically, a coefficient for forming an inverse filter which is a filter for eliminating blur, that is, a multiplication coefficient to be applied to reference pixels surrounding the current correction pixel is calculated.

An example of the tap selection processing in the tap selection unit 125 and the calculation processing of the correction parameter in the correction parameter calculating unit 126 will be described with reference to FIGS. 10A, 10B, 10C, 11A, 11B, and 11C.

Figure 10A:
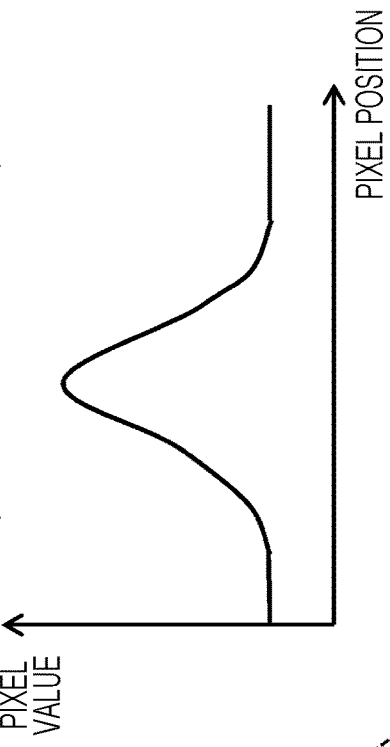
FIGS. 10A, 10B, and 10C are diagrams explaining an example of image correction processing in the case where PSF information indicating a blur mode is used as a feature amount.
Figure 10B:
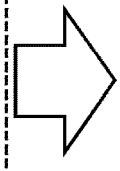
Figure 10C:
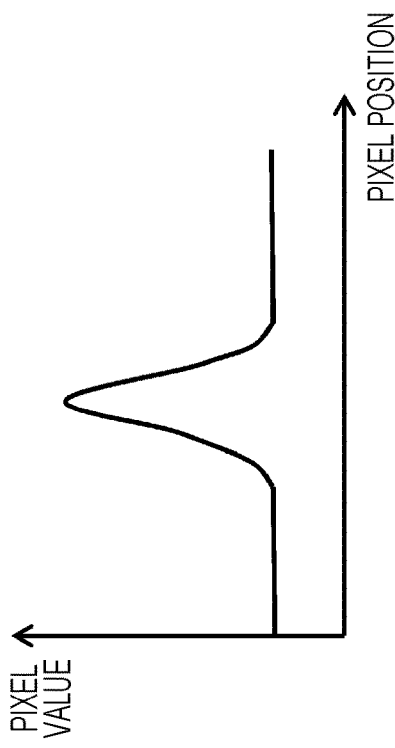

FIGS. 10A, 10B, and 10C illustrates the following drawings.

FIG. 10A Pixel value distribution example of image before correction

FIG. 10B Example of tap settings and correction parameter (multiplication coefficient Ki)

FIG. 10C Pixel value distribution example of image after correction

Item (a1) Pixel value distribution example of image before correction includes a pixel value distribution example of an infrared light image to be corrected.

As described above, the infrared light image has been captured by a first imaging element 111 having a low density pixel configuration arranged in an infrared light image imaging unit 107 and is also a low resolution image that has been subjected to enlargement processing by a scaler 121, and thus a pixel value distribution thereof smoothly reflects the luminance of the subject. That is, the infrared light image has large blur.

The tap selection unit 125 performs tap selection for performing image correction in which the infrared light image having such large blur is corrected such that a clear image with less blur is obtained. Specifically, a range of the reference pixels to be applied to the correction processing of pixel values of pixels to be corrected is set.

The tap selection unit 125 determines a reference area to be used for pixel value correction in the image correcting unit 127 on the basis of the feature amount input from the feature amount extracting unit 124.

Specifically, for example, a wider reference pixel area (tap area) is set as a blur amount in the post-position matching infrared light image 203 is larger.

Furthermore, the correction parameter calculating unit 126 calculates a correction parameter to be applied to the correction processing of pixel values of the pixels to be corrected. Specifically, a coefficient for forming an inverse filter which is a filter for eliminating blur, that is, a multiplication coefficient $K_i$ to be applied to reference pixels surrounding the current correction pixel is calculated.

The correction parameter calculating unit 126 determines a correction parameter to be used for pixel value correction in the image correcting unit 127 on the basis of a feature amount input from the feature amount extracting unit 124.

Specifically, for example, an effective correction parameter for eliminating the blur of the post-position matching infrared light image 203 is determined.

In "FIG. 10B Example of tap settings and correction parameter (multiplication coefficient Ki)", with a pixel to be corrected pixel arranged in the center, positions of surrounding reference pixels used for correction of a pixel value of the current correction pixel and values of the multiplication coefficient Ki for each of the reference pixels are illustrated.

In the example illustrated in the drawing, 3×3=9 pixels centered at the current correction pixel are illustrated. Values 0, −1, and 9 illustrated in the nine pixel positions are the multiplication coefficient Ki that is the correction parameter calculated by the correction parameter calculating unit 126. Note that i is a pixel position identifier indicating a pixel position.

The tap selection unit 125 selects a pixel position referred to for calculating a corrected pixel value of the current correction pixel as the tap position. In the example illustrated in the figure, pixel positions set with −1 or 9 are taps.

The correction parameter calculating unit 126 calculates a multiplication coefficient Ki to multiply pixel values at tap positions. These are −1 and 9 illustrated in FIG. 10B.

The selection tap information set by the tap selection unit 125, that is, the reference pixel position information and the correction parameter calculated by the correction parameter calculating unit 126, that is, the multiplication coefficient $K_i$ for a pixel value of each reference pixel position are input to the image correcting unit 127.

The image correcting unit 127 calculates a corrected pixel value of the current correction pixel on the basis of these input values. Specifically, a corrected pixel value T of the current correction pixel is calculated by application of the following equation for corrected pixel value calculation (equation 2) illustrated in step S124 in FIG. 9.

The corrected pixel value T is calculated from the following (equation 2).

[Mathematical Formula 2]

$$T = \sum_{i=0}^{n} Ki \times Ti \quad \text{(Equation 2)}$$

Note that in the above (equation 2), respective symbols have the following meanings.

T: Corrected pixel value of current correction pixel
$T_i$: pixel value of reference pixel
i: pixel identifier of reference pixel
$K_i$: Multiplication coefficient corresponding to reference pixel i The current correction pixel is, for example, a pixel at the central position out of the 3×3=9 pixels illustrated in 10B.

Reference pixels are respective pixels of the 3×3=9 pixels, and Ti represent a pixel value of each of these pixels. Symbol i is an identifier of a pixel. In the case of referring to the nine pixels, n=8 is set, and a corrected pixel value T is calculated using pixel values of the respective pixels of i=0 to 8.

Symbol Ki represents a multiplication coefficient for a pixel value Ti set to each pixel position i.

A pixel value of the current correction pixel is calculated from the above (equation 2).

Note that the tap settings and settings of the correction parameter (multiplication coefficient) illustrated in FIG. 10B are mere examples, and settings of taps and a correction parameter are changed to various settings depending on a feature amount.

The image correcting unit 127 sequentially calculates corrected pixel values of all of the pixels included in the post-position matching infrared light image 203 from the above (equation 2) and generates and outputs a corrected infrared light image 205 thereby calculated.

A pixel value distribution example of the corrected infrared light image 205 is illustrated in FIG. 10C.

With the pixel value distribution of the corrected infrared light image 205, as compared with the pixel value distribution of the infrared light image before correction illustrated in FIG. 10A, the image has a steeper gradient in the pixel value variation with eliminated blur.

This is a result of performing the pixel value correction in which an inverse filter set with the coefficient is applied as a blur elimination filter.

In this manner, correcting pixel values of the infrared light image using the PSF information which is a feature amount indicating a blur mode of the infrared light image enables improvement of the image quality of the infrared light image with much blur. In other words, it becomes possible to generate and output the corrected infrared light image 205 with a reduced blur amount.

Note that the example illustrated in FIGS. 10A and 10B is an example of tap settings and settings of a correction parameter (multiplication coefficient Ki) in a case where a spread of blur is relatively narrow.

The tap settings and setting of the correction parameter (multiplication coefficient Ki) are changed depending on the PSF acquired as a feature amount, that is, the blur mode.

FIGS. 11A, 11B, and 11C illustrate an example of tap settings and settings of a correction parameter (multiplication coefficient Ki) in a case where a spread of blur is relatively wide.

As illustrated in FIGS. 11A and 11B, in a case where a blur amount is large, processing is performed such that corrected pixel values are determined on the basis of pixel values of reference pixels in a wider range by using tap settings that allow a pixel area to be referred to for determination to be larger.

In this manner, by executing the reference pixel area selecting processing to be applied to the correction processing, that is, the tap selection processing on the basis of the point spread function (PSF) information calculated by the feature amount calculating unit 124 and performing correction processing by calculating the correction parameter (multiplication coefficient), optimum pixel value correction depending on a blur mode becomes possible, and generation of a high quality corrected infrared light image with reduced blur becomes possible.

[2-3. Exemplary Processing of Generating High Quality Image by Image Correction Processing Using Noise Information as Image Feature Amount]

Next, a processing example in which noise information is acquired as an image feature amount and image quality improvement processing of an infrared light image is performed by image correction processing using the acquired noise information will be described.

Figure 12:
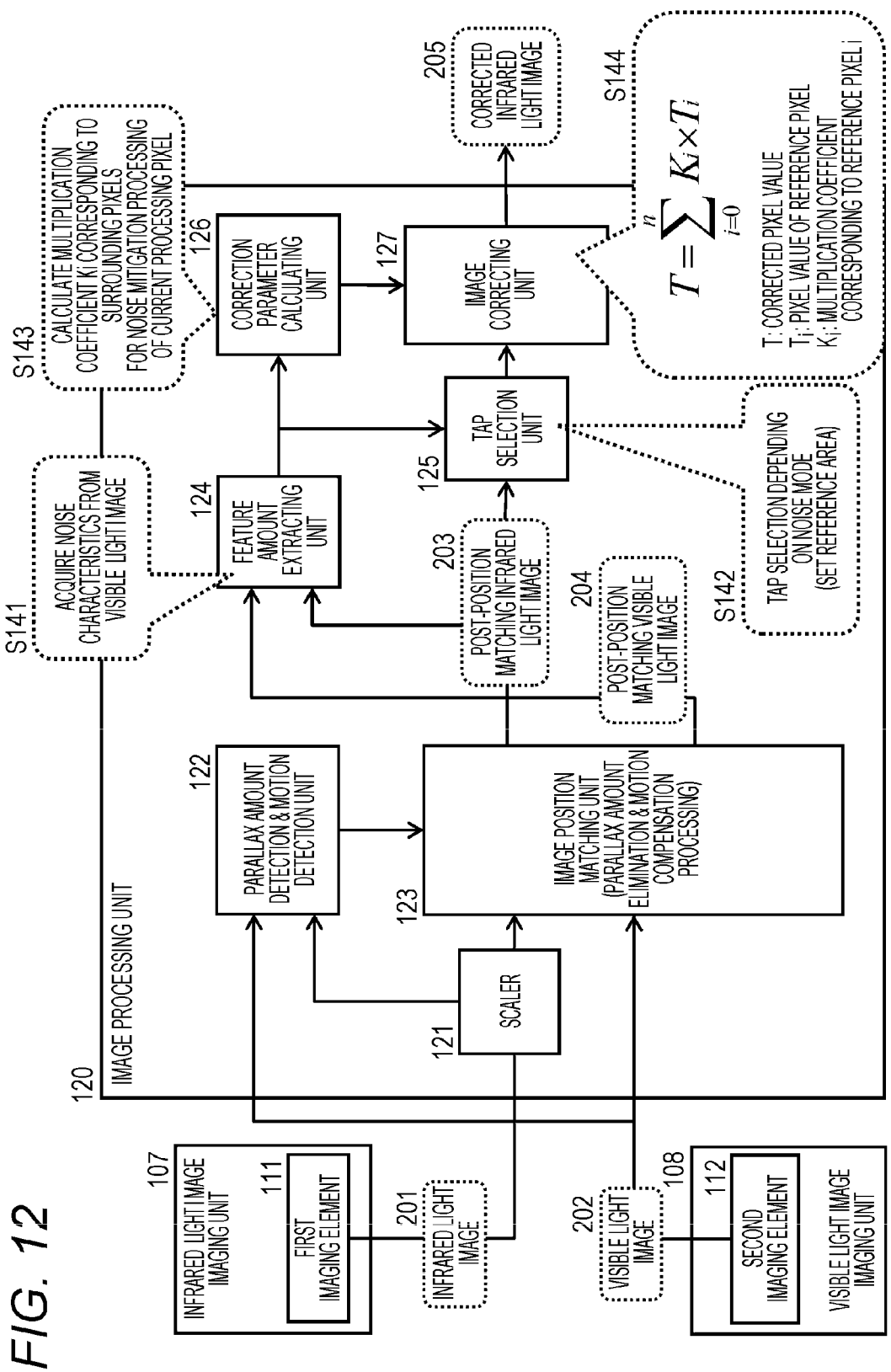
FIG. 12 is a diagram explaining the configuration and processing of the image processing unit that executes image correction processing in the case where noise information is used as a feature amount.

Like FIGS. 7 and 9, FIG. 12 is a diagram illustrating a configuration similar to that of the image processing unit 120 described with reference to FIG. 5.

A feature amount extracting unit 124 extracts noise information as an image feature amount from a post-position matching visible light image 204 and outputs the post-position matching visible light image 204 to a tap selection unit 125 and a correction parameter calculating unit 126.

The tap selection unit 125, the correction parameter calculating unit 126, and an image correcting unit 127 execute tap setting processing and correction parameter calculating processing to be applied to image correction processing for improving the image quality of the post-position matching infrared light image 203 on the basis of the noise information extracted by the feature amount extracting unit 124 from the post-position matching visible light image 204 as well as the image correction processing.

FIG. 12 illustrates respective processing executed by the feature amount extracting unit 124, the tap selection unit 125, the correction parameter calculating unit 126, and the image correcting unit 127.

As illustrated in FIG. 12, the feature amount extracting unit 124 acquires the noise information as an image feature amount from the post-position matching visible light image 204 in step S141.

As described above with reference to FIG. 6C, the noise information indicates noise included in the image. An image captured by a camera contains some noise.

As illustrated in the specific example of FIG. 6C2, pixel values set in the image includes a predetermined amount of noise, and a pixel value is obtained by adding a predetermined amount of noise to the original color or luminance of the subject. Note that noise includes various types of noise such as high frequency noise and low frequency noise.

Note that Here, the noise information is acquired using the post-position matching visible light image 204.

The noise information extracted from the post-position matching visible light image 204 by the feature amount extracting unit 124 is input to the tap selection unit 125 and the correction parameter calculating unit 126.

In step S142, the tap selection unit 125 executes, on the basis of the noise information extracted by the feature amount extracting unit 124 from the post-position matching visible light image 204, reference pixel area selecting processing to be applied to correction processing, that is, tap selection processing.

Specifically, for example, a wider reference pixel area (tap area) is set as noise included the post-position matching visible light image 204 includes more noise having a low frequency band component.

In addition, in step S143, the correction parameter calculating unit 126 calculates, on the basis of the noise information extracted by the feature amount extracting unit 124 from the post-position matching visible light image 204, a correction parameter to be applied to correction processing.

Specifically, a multiplication coefficient to be applied to reference pixels surrounding the current correction pixel is calculated.

An example of the tap selection processing in the tap selection unit 125 and the calculation processing of the correction parameter in the correction parameter calculating unit 126 will be described with reference to FIGS. 13A, 13B, 13C, 14A, 14B, and 14C.

FIGS. 13A, 13B, and 13C illustrate the following drawings.

FIG. 13A Pixel value distribution example of image before correction

FIG. 13B Example of tap settings and correction parameter (multiplication coefficient Ki)

FIG. 13C Pixel value distribution example of image after correction

Item (a1) Pixel value distribution example of image before correction includes a pixel value distribution example of an infrared light image to be corrected.

As described above, the infrared light image has been captured by a first imaging element 111 having a low density pixel configuration arranged in an infrared light image imaging unit 107 and is also a low resolution image that has been subjected to enlargement processing by a scaler 121, and thus a pixel value distribution thereof smoothly reflects the luminance of the subject. The image includes more noise than a visible light image which is a high resolution image.

The tap selection unit 125 performs tap selection for performing image correction in which the infrared light image including much noise is corrected such that an image with less noise is obtained. Specifically, a range of the reference pixels to be applied to the correction processing of pixel values of pixels to be corrected is set.

The tap selection unit 125 determines a reference area to be used for pixel value correction in the image correcting unit 127 on the basis of the feature amount input from the feature amount extracting unit 124.

Specifically, for example, a wider reference pixel area (tap area) is set as noise in the post-position matching visible light image 204 includes more noise having a low frequency band component.

Furthermore, the correction parameter calculating unit 126 calculates a correction parameter to be applied to the correction processing of pixel values of the pixels to be corrected. Specifically, a coefficient for forming a filter for reducing noise, that is, a multiplication coefficient $K_i$ to be applied to reference pixels surrounding the current correction pixel is calculated.

The correction parameter calculating unit 126 determines a correction parameter to be used for pixel value correction in the image correcting unit 127 on the basis of a feature amount input from the feature amount extracting unit 124.

Specifically, for example, a correction parameter effective for noise reduction is determined depending on a noise component included in the post-position matching visible light image 204.

In "FIG. 13B Example of tap settings and correction parameter (multiplication coefficient Ki)" in FIG. 13, with a pixel to be corrected pixel arranged in the center, positions of surrounding reference pixels used for correction of a pixel value of the current correction pixel and values of the multiplication coefficient Ki for each of the reference pixels are illustrated.

In the example illustrated in the drawing, 3×3=9 pixels centered at the current correction pixel are illustrated. Values 1/9 illustrated in the nine pixel positions are the multiplication coefficient Ki that is the correction parameter calculated by the correction parameter calculating unit 126. Note that i is a pixel position identifier indicating a pixel position.

Note that these coefficient settings correspond to coefficient settings of a smoothing filter.

The tap selection unit 125 selects a pixel position referred to for calculating a corrected pixel value of the current correction pixel as the tap position. In the example illustrated in the figure, all the nine pixel positions set with 1/9 are taps.

The correction parameter calculating unit 126 calculates a multiplication coefficient Ki to multiply pixel values at tap positions. That is, 1/9 illustrated in FIG. 13B.

The selection tap information set by the tap selection unit 125, that is, the reference pixel position information and the correction parameter calculated by the correction parameter calculating unit 126, that is, the multiplication coefficient $K_i$ for a pixel value of each reference pixel position are input to the image correcting unit 127.

The image correcting unit 127 calculates a corrected pixel value of the current correction pixel on the basis of these input values. Specifically, a corrected pixel value T of the current correction pixel is calculated by application of the following equation for corrected pixel value calculation (equation 3) illustrated in step S144 in FIG. 12.

The corrected pixel value T is calculated from the following (equation 3).

[Mathematical Formula 3]

$$T = \sum_{i=0}^{n} Ki \times Ti \quad \text{(Equation 3)}$$

Note that in the above (equation 3), respective symbols have the following meanings.

T: Corrected pixel value of current correction pixel
$T_i$: pixel value of reference pixel
i: pixel identifier of reference pixel
$K_i$: Multiplication coefficient corresponding to reference pixel i The current correction pixel is, for example, a pixel at the central position out of the 3×3=9 pixels illustrated in FIG. 13B.

Reference pixels are respective pixels of the 3×3=9 pixels, and Ti represent a pixel value of each of these pixels. Symbol i is an identifier of a pixel. In the case of referring to the nine pixels, n=8 is set, and a corrected pixel value T is calculated using pixel values of the respective pixels of i=0 to 8.

Symbol Ki represents a multiplication coefficient for a pixel value Ti set to each pixel position i.

A pixel value of the current correction pixel is calculated from the above (equation 3).

Note that the tap settings and settings of the correction parameter (multiplication coefficient) illustrated in FIG. 13B are mere examples, and settings of taps and a correction parameter are changed to various settings depending on a feature amount.

The image correcting unit 127 sequentially calculates corrected pixel values of all of the pixels included in the post-position matching infrared light image 203 from the above (equation 3) and generates and outputs a corrected infrared light image 205 thereby calculated.

A pixel value distribution example of the corrected infrared light image 205 is illustrated in FIG. 13C.

With the pixel value distribution of the corrected infrared light image 205, as compared with the pixel value distribution of the infrared light image before correction illustrated in FIG. 13A, the image has reduced noise included in the pixel values.

This is a result of performing the pixel value correction in which, for example, a smoothing filter set with a coefficient is applied as a noise elimination filter.

In this manner, correcting pixel values of the infrared light image using the noise information which is a feature amount indicating a noise mode of the infrared light image enables improvement of the image quality of the infrared light image with much noise. In other words, it becomes possible to generate and output the corrected infrared light image 205 with a reduced noise amount.

Note that the example illustrated in FIGS. 13A and 13B is an example of tap settings and settings of a correction parameter (multiplication coefficient Ki) in a case where a large part of noise included in the infrared light image is noise having a high frequency band component and there is relatively small amount of noise having a low frequency band component.

The tap settings and setting of the correction parameter (multiplication coefficient Ki) are changed depending on the noise information acquired as a feature amount.

FIGS. 14A, 14B, and 14C illustrate an example of tap settings and settings of a correction parameter (multiplication coefficient Ki) in the case where there are more noise having a low frequency band component as compared with the example of FIGS. 13A, 13B, and 13C.

As illustrated in FIGS. 14A and 14B, in a case where noise having a low frequency band component is large, processing is performed such that corrected pixel values are determined on the basis of pixel values of reference pixels in a wider range by using tap settings that allow a pixel area to be referred to for determination to be larger.

In this manner, by executing the reference pixel area selecting processing to be applied to the correction processing, that is, the tap selection processing on the basis of the noise information calculated by the feature amount calculating unit 124 and performing correction processing by calculating the correction parameter (multiplication coefficient), optimum pixel value correction depending on a noise mode becomes possible, and generation of a high quality corrected infrared light image with reduced noise becomes possible.

Note that in the embodiments of the respective image processing devices described above, an example of performing image correction processing in which the three feature amounts illustrated in FIGS. 6A1 6A2, 6B1, 6B2, 6C1, and 6C2, that is:

FIG. 6A Luminance distribution information;
FIG. 6B Point spread function (PSF) (=function indicating a blur mode); and
FIG. 6C Noise information are individually applied, that is, image quality improvement processing of an infrared light image has been described.

As described above, it is possible to perform image correction using one type of feature amount. However, image correction may be performed by combining any two or three of the above feature amounts FIGS. 6A, 6B, and 6C.

[3. Exemplary Configuration of Performing Image Quality Improvement Processing of Visible Light Image]

The image processing devices described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C execute image quality improvement processing of an infrared light image only.

Next, with reference to FIG. 15 and the subsequent drawings, a configuration and processing of an image processing device that executes image quality improvement processing also on a visible light image in addition to an infrared light image will be described.

Figure 15:
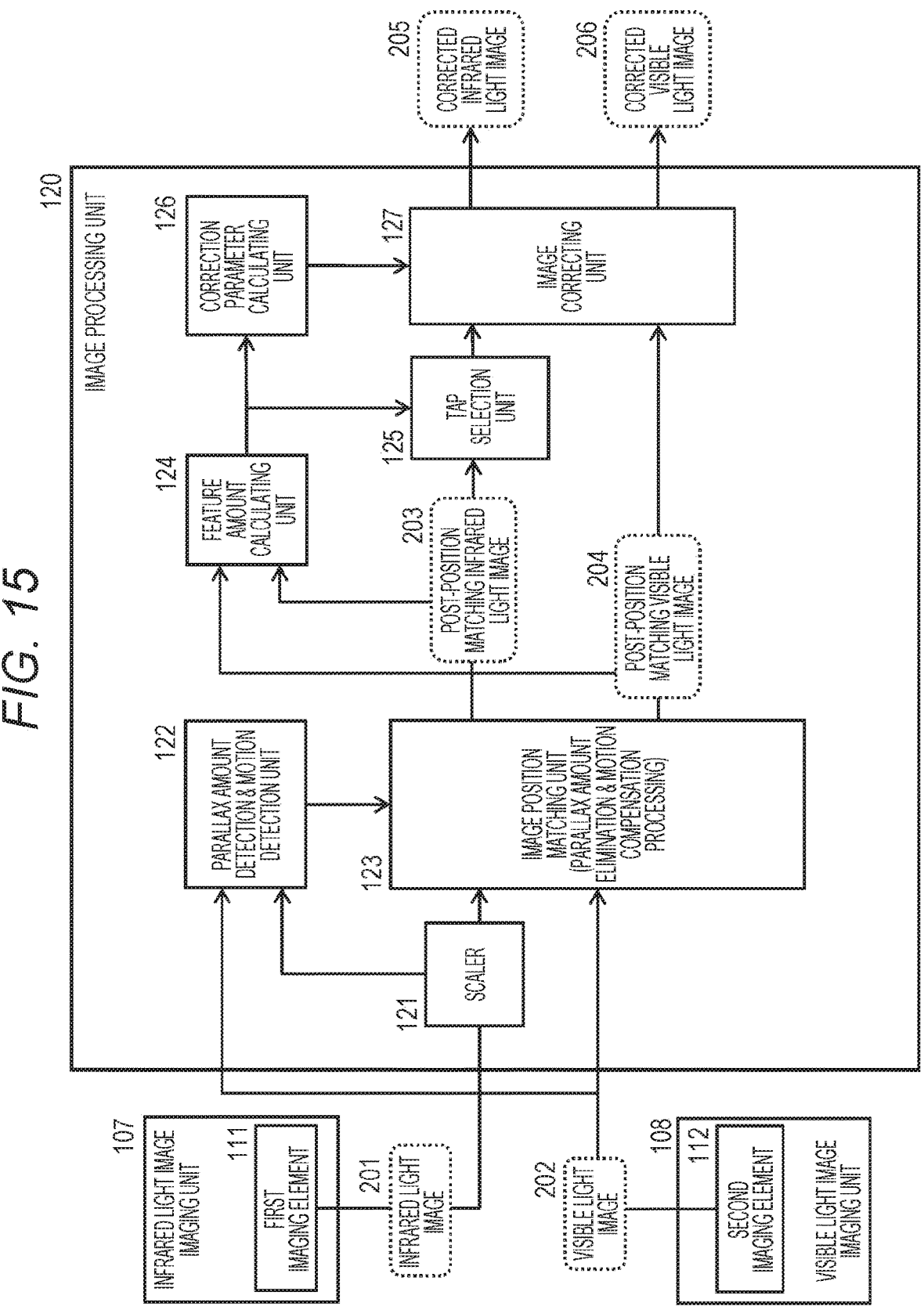
FIG. 15 is a diagram explaining the configuration and processing of an image processing unit.

FIG. 15 is a diagram illustrating a configuration example of an image processing device of this embodiment. The configuration illustrated in FIG. 15 has a substantially similar configuration to that of FIG. 5 described above. A different point is that a post-position matching visible light image 204 output from an image position matching unit 123 is input to an image correcting unit 127 and that the image correcting unit 127 performs image correction as image quality improvement processing on the post-position matching visible light image 204 and outputs a corrected visible light image 206.

The rest of the configuration is similar to the configurations described with reference to FIG. 5 and the subsequent drawings, and as for an infrared light image, similar image quality improvement processing to those described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C is performed thereon, and a corrected infrared light image 205 is thereby output.

That is, in the present embodiment, the image correcting unit 127 executes, on an infrared light image, similar quality improvement processing to those described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C and further executes, on a visible light image, image correction processing as image quality improvement processing.

The configuration and processing of the image correcting unit 127 will be described with reference to FIG. 16.

Figure 16:
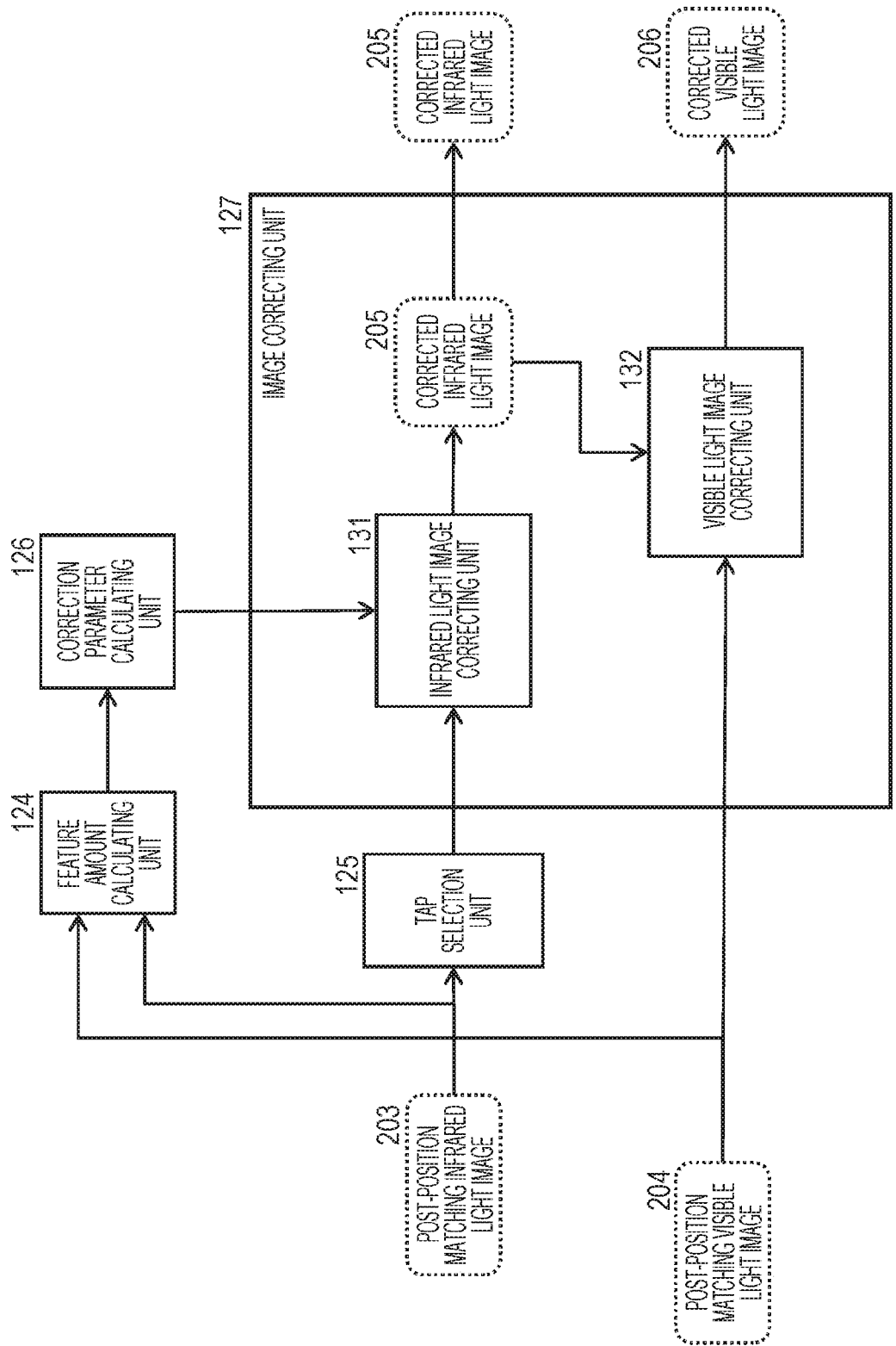
FIG. 16 is a diagram explaining the configuration and processing of an image correcting unit.

As illustrated in FIG. 16, the image correcting unit 127 includes an infrared light image correcting unit 131 and a visible light image correcting unit 132.

The infrared light image correcting unit 131 executes image correction processing based on tap settings and correction parameter settings similar to those described above with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C and generates and outputs the corrected infrared light image 205 with improved image quality.

In the present embodiment, the corrected infrared light image 205 is further input to the visible light image correcting unit 132.

The visible light image correcting unit 132 executes superimposition processing of the corrected infrared light image 205 on the post-position matching visible light image 204. Specifically, for example, blending processing of pixel values at corresponding positions (same coordinate positions) of the post-position matching visible light image 204 and the corrected infrared light image 205, in other words, for example, processing of adding high frequency band components of the corrected infrared light image 205 to the post-position matching visible light image 204 is executed, and thereby the corrected visible light image 206 is generated and output.

The corrected infrared light image 205 is the image quality of which has been improved by the processing described above with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C, and by blending pixel values set in the image with the improved quality with the original pixel values of the post-position matching visible light image 204, a corrected image of the visible light image is generated.

By this processing, the corrected visible light image 206 with improved image quality is generated and output.

[4. Other Embodiments of Image Processing Device]

Next, other embodiments of the image processing device will be described with reference to FIG. 17 and the subsequent drawings.

The following embodiments will be described in order.

(1) Embodiment in which reduced image of captured image is generated and image processing is executed on reduced image (2) Embodiment in which pseudo-infrared light image based on visible light image is generated and parallax amount and motion information is calculated using captured infrared light image and pseudo-infrared light image (3) Embodiment in which corrected infrared light image generated by image correcting unit is fed back and reused (4) Embodiment in which only infrared light image is used without using visible light image

[4-1. Embodiment in which Reduced Image of Captured Image is Generated and Image Processing is Executed on Reduced Image]

First, an embodiment in which reduced image of captured image is generated and image processing is executed on the reduced image is described with reference to FIG. 17.

Figure 17:
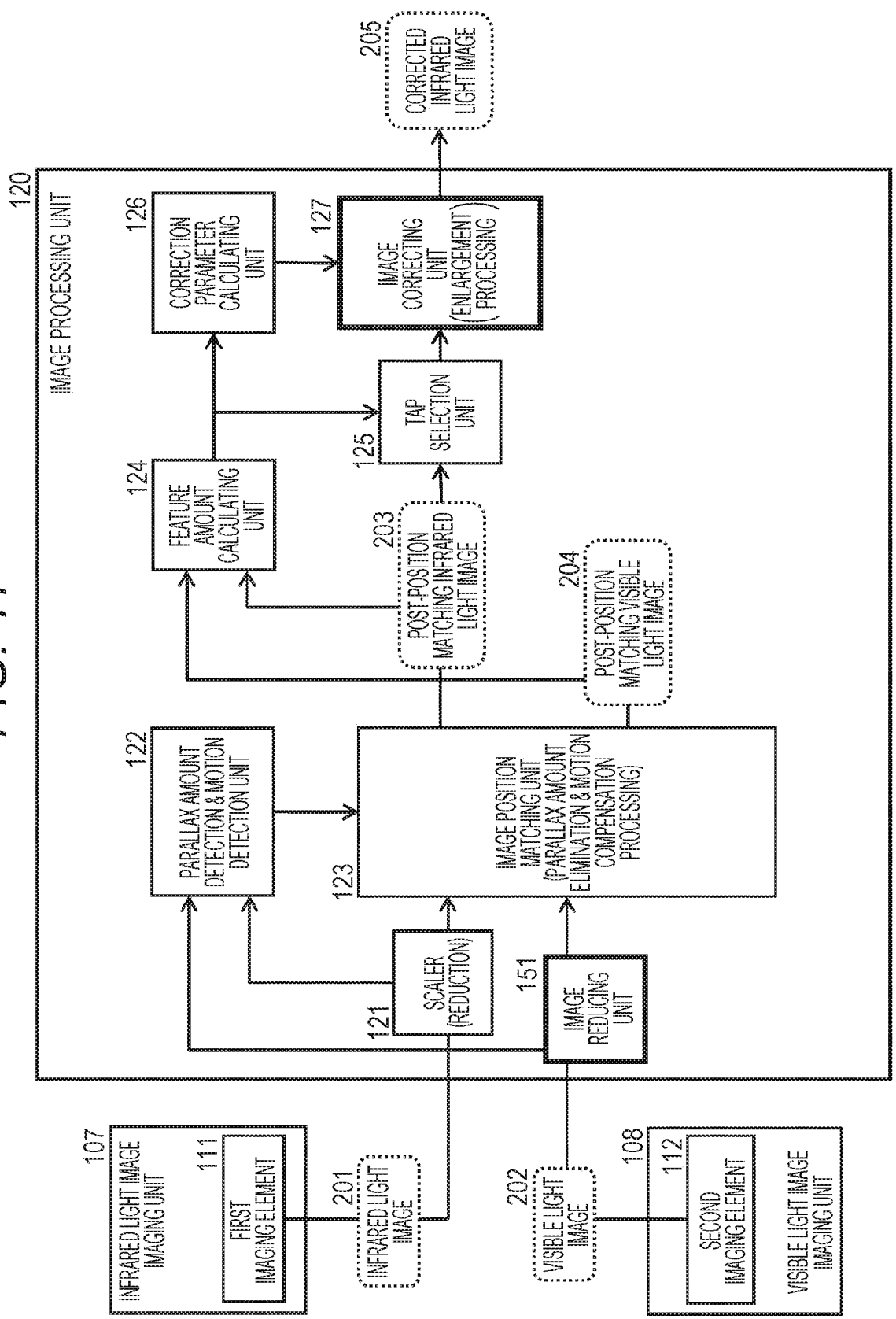
FIG. 17 is a diagram explaining the configuration and processing of the image processing device.

FIG. 17 is a diagram illustrating a configuration of an image processing device of this embodiment.

The configuration illustrated in FIG. 17 has a substantially similar configuration to that of FIG. 5 described above. Different points are that an image reducing unit 151 is added and that an image correcting unit 127 executes image enlargement processing.

The rest of the configuration is similar to the configurations described with reference to FIGS. 5 and 14, and as for an infrared light image, similar image quality improvement processing to those described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C is performed thereon, and a corrected infrared light image 205 is thereby output.

In the image processing device illustrated in FIG. 17, the size of a visible light image 202 captured by a visible light image imaging unit 108 is reduced in the image reducing unit 151.

Furthermore, a scaler 121 executes processing of reducing the size of an infrared light image 201 captured by an infrared light image imaging unit 107 to the same size as the visible light size having been reduced in the image reducing unit 151.

In the subsequent processing, that is, in a parallax amount detection & motion detection unit 122, an image position matching unit 123, a feature amount calculating unit 124, a tap selection unit 125, a correction parameter calculating unit 126, and the image correcting unit 127, processing is executed using this reduced image.

Finally, the image correcting unit 127 executes enlargement processing of enlarging the infrared light image with high image quality generated on the basis of the reduced image tor the original size or a similar image size to the original size of the visible light image and thereby outputs the enlarged infrared light image as the corrected infrared light image 205.

In this embodiment, the parallax amount detection & motion detection unit 122, the image position matching unit 123, the feature amount calculating unit 124, the tap selection unit 125, the correction parameter calculating unit 126, and the image correcting unit 127 execute the processing using the reduced image, thereby enabling reduction in processing time and resources such as a memory and a data processing unit necessary for the processing.

Thus, this allows reliable processing to be performed at a high speed even in a mobile terminal or other devices with limited data processing function or a small memory capacity.

[4-2. Embodiment in which Pseudo-Infrared Light Image Based on Visible Light Image is Generated and Parallax Amount and Motion Information are Calculated Using Captured Infrared Light Image and Pseudo-Infrared Light Image]

Next, an embodiment in which a pseudo-infrared light image based on a visible light image is generated and the parallax amount and motion information are calculated using the captured infrared light image and the pseudo-infrared light image will be described with reference to FIG. 18.

Figure 18:
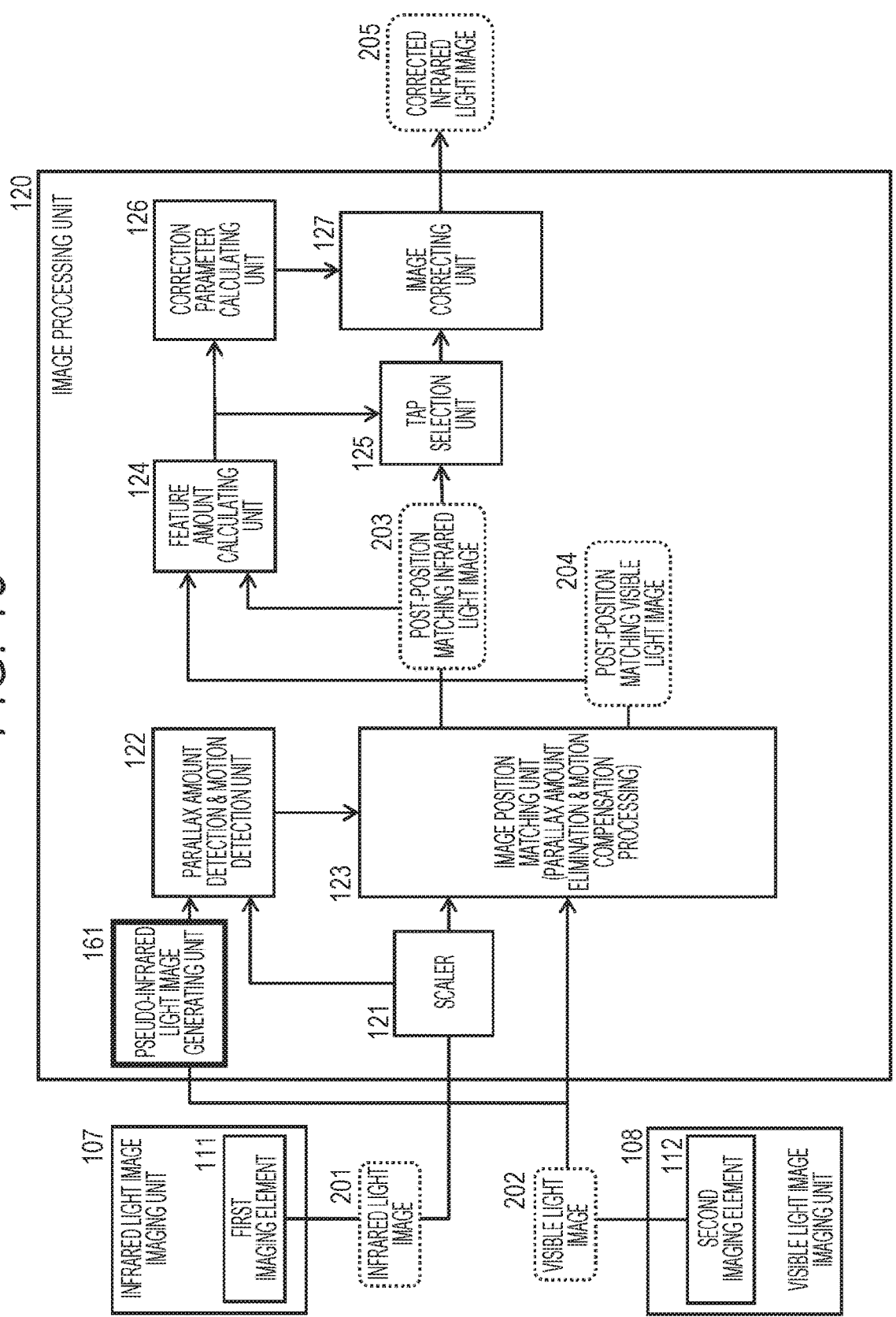
FIG. 18 is a diagram explaining the configuration and processing of the image processing device.

FIG. 18 is a diagram illustrating a configuration of an image processing device of this embodiment.

The configuration illustrated in FIG. 18 has a substantially similar configuration to that of FIG. 5 described above. A different point is that a pseudo-infrared light image generating unit 161 is added.

The rest of the configuration is similar to the configurations described with reference to FIGS. 5, 14A, 14B, and 14C, and as for an infrared light image, similar image quality improvement processing to those described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13, 13C, 14A, 14B, and 14C is performed thereon, and a corrected infrared light image 205 is thereby output.

In the image processing device illustrated in FIG. 18, a visible light image 202 captured by a visible light image imaging unit 108 is input to the pseudo-infrared light image generating unit 161, and the pseudo-infrared light image generating unit 161 generates a pseudo-infrared light image based on the visible light image 202.

The visible light image 202 has, for example, a pixel array according to the Bayer array including the respective RGB pixels described above with reference to FIG. 2A.

The pseudo-infrared light image generating unit first executes demosaic processing based on the RGB array image and sets a G pixel value to every pixel. Furthermore, on the basis of the G pixel value, a pseudo-infrared light pixel value (IR) is calculated.

For example, an infrared light pixel value (IRi) of each pixel i included in an image is calculated from the following equation.

$$IRi = a \times Gi$$

Note that the above example using the G pixel value is merely an example, and the pseudo-infrared light image generating unit may generate the pseudo-infrared light image 161 based on the visible light image 202 by applying another method.

In the above equation:
symbol i represents an identifier of a pixel;
symbol $IR_i$ represents a pseudo-infrared light pixel value of a pixel i of the pseudo-infrared light image;
symbol a represents a predetermined coefficient; and
$G_i$ represents a pixel value of a pixel i of the image generated by the demosaic processing of the visible light image.

The pseudo-infrared light image generated by the pseudo-infrared light image generating unit 161 on the basis of the visible light image 202 is input to the parallax amount detection & motion detection unit 122 together with the infrared light image captured by an infrared light image imaging unit 107 and adjusted to the same size as the visible light image 202 by a scaler 121.

The parallax amount detection & motion detection unit 122 compares these two input images and detects the parallax amount and the motion amount between the images.

In this embodiment, the parallax amount detection & motion detection unit 122 is configured to detect the parallax amount and the motion amount between images by using two images having the same quality which are an infrared light image and a pseudo-infrared light image, thereby enabling detection processing with higher accuracy.

Subsequent processing by an image position matching unit 123, a feature amount calculating unit 124, a tap selection unit 125, a correction parameter calculating unit 126, and an image correcting unit 127 is similar to that described above with reference to FIGS. 5, 14A, 14B, and 14C. The infrared light image is subjected to image quality improvement processing similar to that described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C, and thereby the corrected infrared light image 205 is output.

[4-3. Embodiment in which Corrected Infrared Light Image Generated by Image Correcting Unit is Fed Back and Reused]

Next, an embodiment in which a corrected infrared light image generated by an image correcting unit is fed back and reused will be described with reference to FIG. 19.

Figure 19:
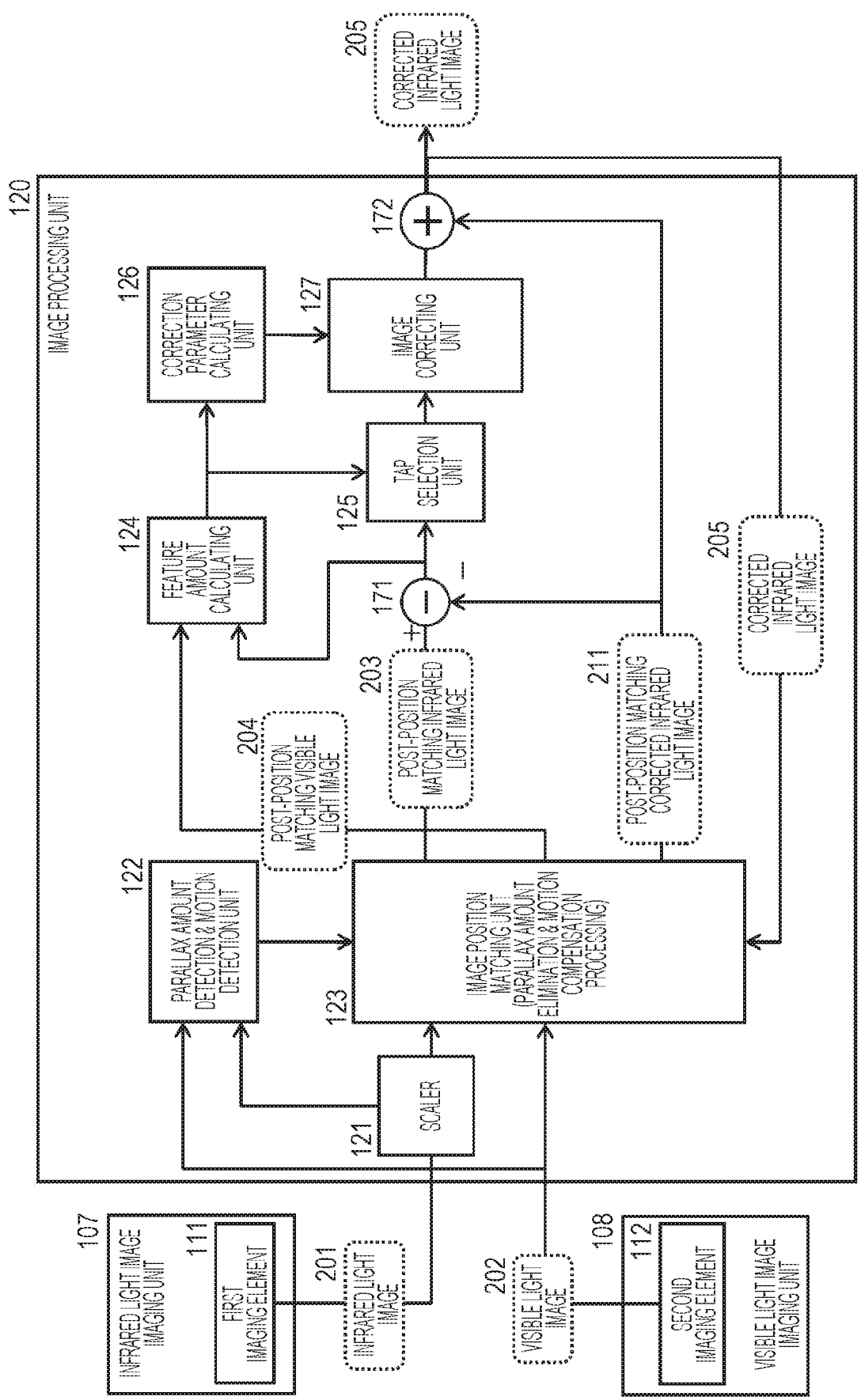
FIG. 19 is a diagram explaining the configuration and processing of the image processing device.

FIG. 19 is a diagram illustrating a configuration of an image processing device of this embodiment.

The configuration illustrated in FIG. 19 has a substantially similar configuration to that of FIG. 5 described above. A different point is that a subtractor 171 and an adder 172 are added.

In the image processing device illustrated in FIG. 19, a post-position matching infrared light image 203 after position matching processing in the image position matching unit 123 is input to the subtractor 171.

In the subtractor 171, a differential image of a post-position matching corrected infrared light image 211 is generated from the post-position matching infrared light image 203.

The post-position matching corrected infrared light image 211 is an image after position matching processing obtained by adjusting each pixel position of a corrected infrared light image 205 generated on the basis of a previous image frame to the same pixel position as that of the post-position matching infrared light image 203.

The differential image output from the subtractor 171 is output to a feature amount calculating unit 124 and further output to an image correcting unit 127 via a tap selection unit 125.

Processing in the feature amount calculating unit 124, the tap selection unit 125, and the image correcting unit 127 is executed on the differential image.

The differential image output from the image correcting unit 127 is input to the adder 172, the adder 172 executes addition processing of the corrected differential image and the post-position matching corrected infrared light image, and the result is output as a corrected infrared light image 205.

Note that the corrected infrared light image 205 is also fed back to the image position matching unit 123 and applied to processing of a next image frame.

In this embodiment, the correction processing is performed in advance, and a preceding image frame which is an image having an improved quality is fed back in correction processing of a next image to be corrected.

This configuration enables performance of correction processing of a next image frame by referring to the preceding correction result, thereby allowing the correction accuracy to be improved.

[4-4. Embodiment in which Only Infrared Light Image is Used without Using Visible Light Image]

Next, an embodiment in which only an infrared light image is used without using a visible light image will be described with reference to FIG. 20.

Figure 20:
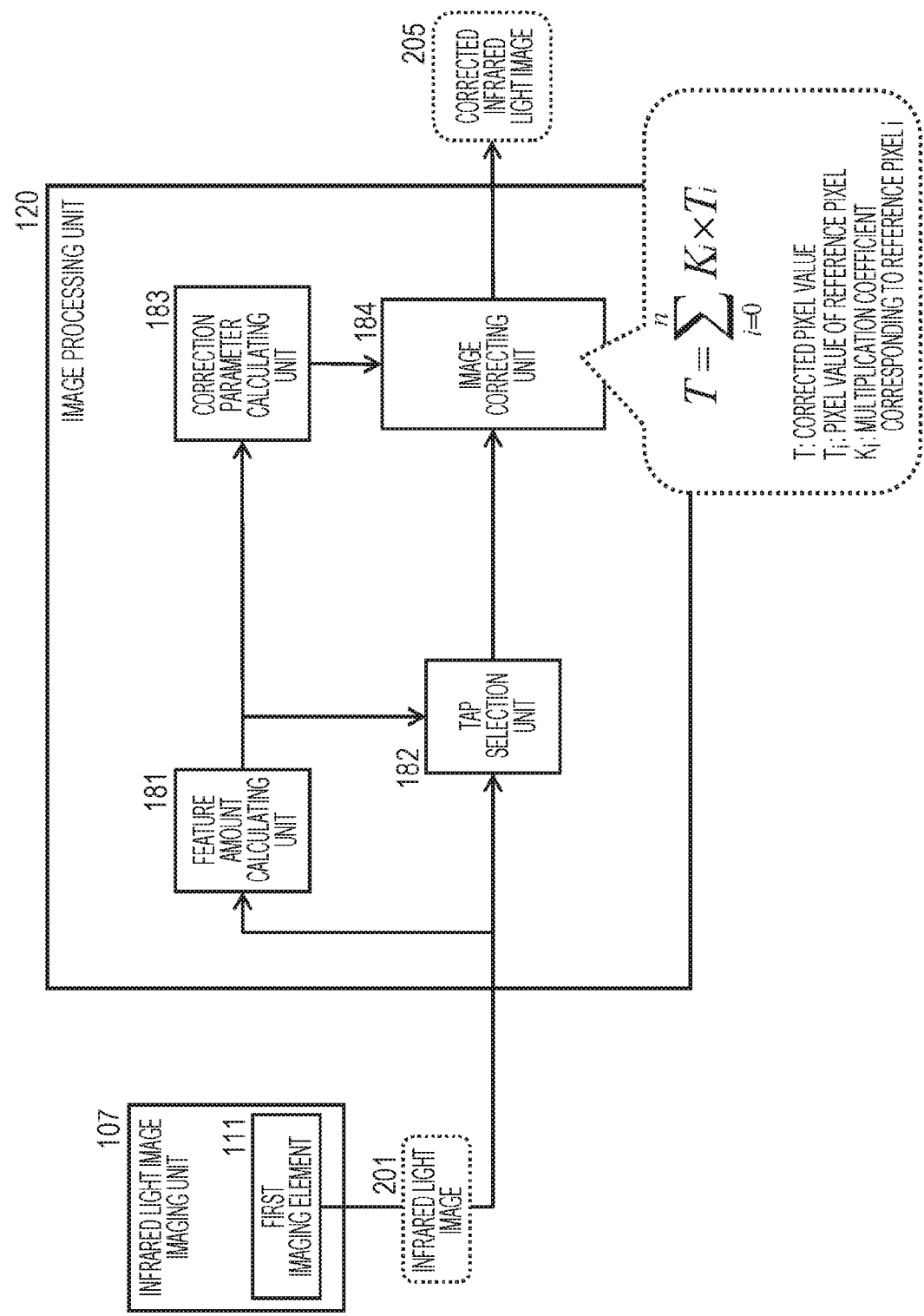
FIG. 20 is a diagram explaining the configuration and processing of the image processing device.

FIG. 20 is a diagram illustrating a configuration of an image processing device of this embodiment.

Unlike the image processing device illustrated in FIG. 5 described above, the image processing device illustrated in FIG. 20 does not have the visible light image imaging unit 108.

Only an infrared light image imaging unit 107 is included, and image processing using only an infrared light image 201 is executed.

Processing executed by the image processing unit 120 will be described.

The image processing unit 120 inputs the infrared light image 201 captured by the infrared light image imaging unit 107 to a feature amount calculating unit 181 and to an image correcting unit 184 via a tap selection unit 182.

The feature amount calculating unit 181 extracts a feature amount of the image from the infrared light image 201, and outputs the extracted feature amount data to the tap selection unit 182 and a correction parameter calculating unit 183.

The feature amount data acquired from the infrared light image 201 by the feature amount calculating unit 181 is, for example, a feature amount described above with reference to FIGS. 6A1 6A2, 6B1, 6B2, 6C1, and 6C2 and includes at least any one of the following three types of image feature amounts.

FIG. 6A Luminance distribution information

FIG. 6B Point spread function (PSF) (=function indicating a blur mode)

FIG. 6C Noise information

The feature amount calculation unit 181 acquires at least one of these three image feature amounts. On the basis of the acquired feature amount, the image correcting unit 184 executes image correction processing as image quality improvement processing on the infrared light image 201 and generates and outputs a corrected infrared light image 205 with improved image quality.

The tap selection unit 182, the correction parameter calculating unit 183, and the image correcting unit 184 illustrated in FIG. 20 execute tap setting processing and correction parameter calculating processing to be applied to image correction processing for improving the image quality of the infrared light image 201 on the basis of the image feature amount calculated by the feature amount calculating unit 181 as well as the image correction processing.

These flows of processing have similar configurations to the processing described above with reference to FIGS. 5, 6A1, 6A2, 6B1, 6B2, 6C1, 6C2, 7, 8A, 8B, 8C, 9, 10A, 10B, 100, 11A, 11B, 110, 12, 13A, 13B, 13C, 14A, 14B, and 14C.

For example, the image correcting unit 184 calculates a corrected pixel value T of the current correction pixel by applying the following equation for corrected pixel value calculation (equation 4) illustrated in FIG. 20.

The corrected pixel value T is calculated from the following (equation 4).

[Mathematical Formula 4]

$$T = \sum_{i=0}^{n} Ki \times Ti \quad \text{(Equation 4)}$$

Note that in the above (equation 4), respective symbols have the following meanings.

T: Corrected pixel value of current correction pixel $T_i$: pixel value of reference pixel i: pixel identifier of reference pixel $K_i$: Multiplication coefficient corresponding to reference pixel i This embodiment uses only the infrared light image and thus is applicable to, for example, a monocular type imaging device.

[5. Sequence of Processing Executed by Image Processing Device]

Next, a processing sequence executed by an image processing device according to the present disclosure will be described.

Figure 21:
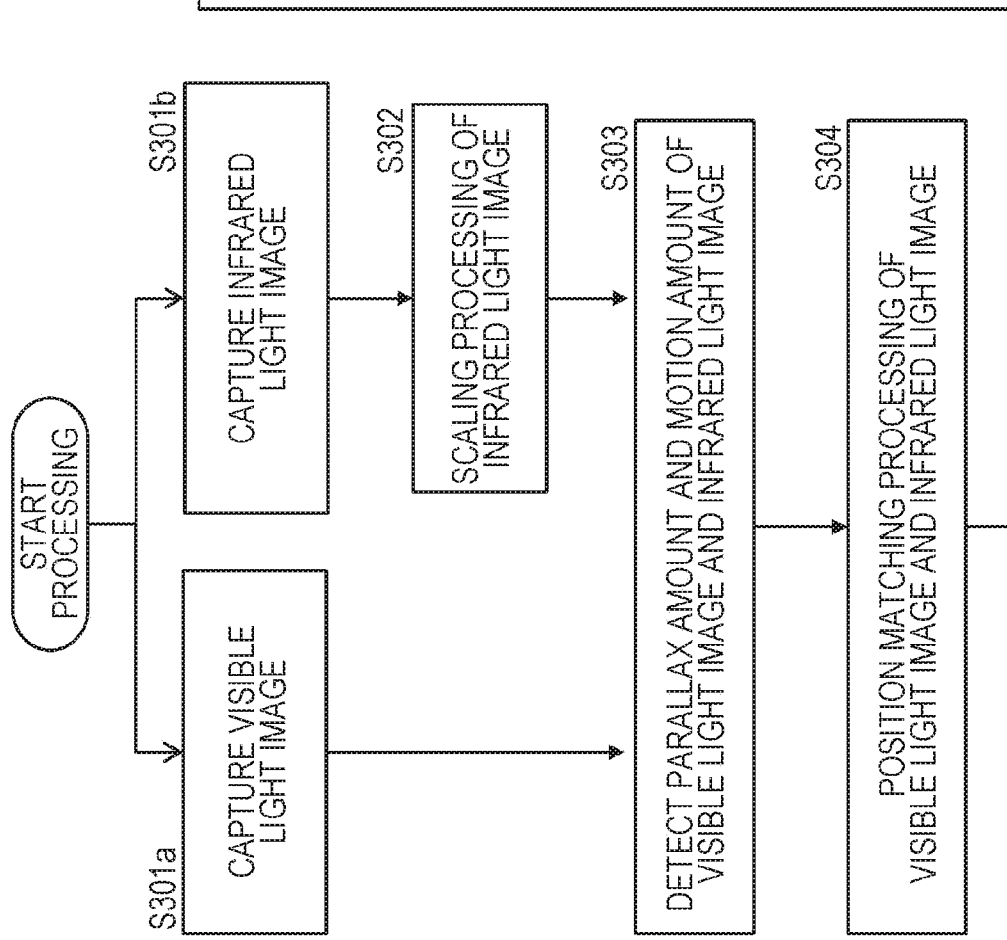
FIG. 21 is a diagram illustrating a flowchart explaining an image processing sequence executed by the image processing device.

FIG. 21 is a flowchart explaining a processing sequence executed in the image processing units of the image processing devices described with reference to FIGS. 5, 6A1, 6A2, 6B1, 6B2, 6C1, 6C2, 7, 8A, 8B, 8C, 9, 10A, 10B, 10C, 11A, 11B, 110, 12, 13A, 13B, 13C, 14A, 14B, and 14C.

Processing according to the flow illustrated in FIG. 21 is executed, for example, under the control of a control unit having a program execution function according to a program stored in a storage unit of the image processing device.

Hereinafter, processing of each step of the flow illustrated in FIG. 21 will be sequentially described.

(Steps S301a and 301b)

Steps S301a and 301b represent image capturing processing.

For example, images are captured by the infrared light image imaging unit 107 and the visible light image imaging unit 108 illustrated in FIG. 5.

Step S301a is imaging processing of the visible light image 202 in the visible light image imaging unit 108 illustrated in FIG. 5.

Step S301b is imaging processing of the infrared light image 201 in the infrared light image imaging unit 107.

(Step S302)

Step S302 is processing executed by the scaler 121 illustrated in FIG. 5.

In step S302, the scaler 121 inputs the infrared light image 201 captured by the infrared light image imaging unit 107 in step S301b and executes scaling processing of adjusting the size of the infrared light image 201 to the size of the visible light image 202.

The infrared light image 201 and the visible light image 202 sizes of which are matched are input to a parallax amount detection & motion detection unit 122 and an image position matching unit 123.

(Step S303)

Step S303 is processing executed by the parallax amount detection & motion detection unit 122 illustrated in FIG. 5.

The parallax amount detection & motion detection unit 122 detects the parallax amount of the infrared light image 201 and the visible light image 202 and the motion amount between the two images.

The infrared light image imaging unit 107 and the visible light image imaging unit 108 are two imaging units set at positions a predetermined distance apart from each other, and thus captured images thereof (the infrared light image 201 and the visible light image 202) are captured from different viewpoints.

The same subject image is not captured in corresponding pixels, that is, pixels at the same position, of the two images from different viewpoints, namely, the infrared light image 201 and the visible light image 202, and a subject shift corresponding to the parallax occurs.

Furthermore, in a case where these two images are not shot at perfectly the same timing and the subject includes a moving subject, positions of the same subject captured in the respective images are different.

The parallax amount detection & motion detection unit 122 detects the parallax amount between the infrared light image 201 and the visible light image 202 and the motion amount between the two images, and inputs these pieces of information, namely, parallax information and motion information, for example a motion vector (MV), to the image position matching unit 123.

(Step S304)

Processing of step S304 is executed by the image position matching unit 123 illustrated in FIG. 5.

The image position matching unit 123 executes position matching processing of the infrared light image 201 having been subjected to the size adjustment and the visible light image 202 using the parallax information and the motion information input from the parallax amount detection & motion detection unit 122.

That is, two position-matched images are generated in which the same subject is captured at the same position of the respective images.

The image position matching unit 123 outputs two images after the position matching, that is, a post-position matching infrared light image 203 and a post-position matching visible light image 204 illustrated in FIG. 5 to a feature amount calculating unit 124.

The post-position matching infrared light image 203 is further input to an image correcting unit 127 via a tap selection unit 125.

(Step S305)

Processing of step S305 is executed by the feature amount calculating unit 124 illustrated in FIG. 5.

The feature amount calculating unit 124 receives the post-position matching infrared light image 203 and the post-position matching visible light image 204, extracts the feature amount of images from these images, and outputs the extracted feature amount data to the tap selection unit 125 and a correction parameter calculating unit 126.

As described above with reference to FIGS. 6A1 6A2, 6B1, 6B2, 6C1, and 6C2, the feature amount acquired from the post-position matching infrared light image 203 and the post-position matching visible light image 204 by the feature amount calculating unit 124 is, for example, at least any one of the following three types of image feature amounts.

FIG. 6A Luminance distribution information

FIG. 6B Point spread function (PSF) (=function indicating a blur mode)

FIG. 6C Noise information

"(1) Luminance distribution information" is distribution information of luminance values of respective pixels in an image.

"(2) Point spread function (PSF) (=function indicating a blur mode)" is a point spread function (PSF) which is a function indicating the blur amount of an image.

"(3) Noise information" is information indicating noise included in an image.

The feature amount calculating unit 124 acquires at least one of the three image feature amounts illustrated in FIGS. 6A1, 6A2, 6B1, 6B2, 6C1, and 6C2 from the post-position matching infrared light image 203 and the post-position matching visible light image 204.

(Step S306)

Processing of step S306 is executed by the tap selection unit 125 illustrated in FIG. 5.

The tap selection unit 125 executes tap setting processing to be applied to image correction processing for improving the image quality of the post-position matching infrared light image 203 on the basis of the image feature amount calculated by the feature amount calculating unit 124.

Specifically, the processing having been described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C is executed.

(Step S307)

Processing of step S307 is executed by the correction parameter calculating unit 126 illustrated in FIG. 5.

The correction parameter calculating unit 126 execute correction parameter calculating processing to be applied to image correction processing for improving the image quality of the post-position matching infrared light image 203 on the basis of the image feature amount calculated by the feature amount calculating unit 124.

Specifically, the processing described above with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C is executed, and calculation of a multiplication coefficient Ki to be applied to a filter or other operations are performed.

(Step S308)

Processing of step S308 is executed by the image correcting unit 127 illustrated in FIG. 5.

The image correcting unit 127 executes the image correction processing for improving the image quality of the post-position matching infrared light image 203 on the basis of the image feature amount calculated by the feature amount calculating unit 124.

Specifically, the processing having been described with reference to FIGS. 5, 6A1, 6A2, 6B1, 6B2, 6C1, 6C2, 7, 8A, 8B, 8C, 9, 10A, 10B, 10C, 11A, 11B, 11C, 12, 13A, 13B, 13C, 14A, 14B, and 14C is executed.

Note that, as described above, image correction processing may be executed by individually applying the image feature amounts of the three feature amounts illustrated in FIGS. 6A1 6A2, 6B1, 6B2, 6C1, and 6C2, that is:

FIG. 6A Luminance distribution information;

FIG. 6B Point spread function (PSF) (=function indicating a blur mode); and

FIG. 6C Noise information, however, image correction may be performed by combining any two or three of the above feature amounts FIGS. 6A, 6B, and 6C.

[6. Example of Hardware Configuration of Image Processing Device]

Next, a hardware configuration example of an image processing device will be described with reference to FIG. 22.

Figure 22:
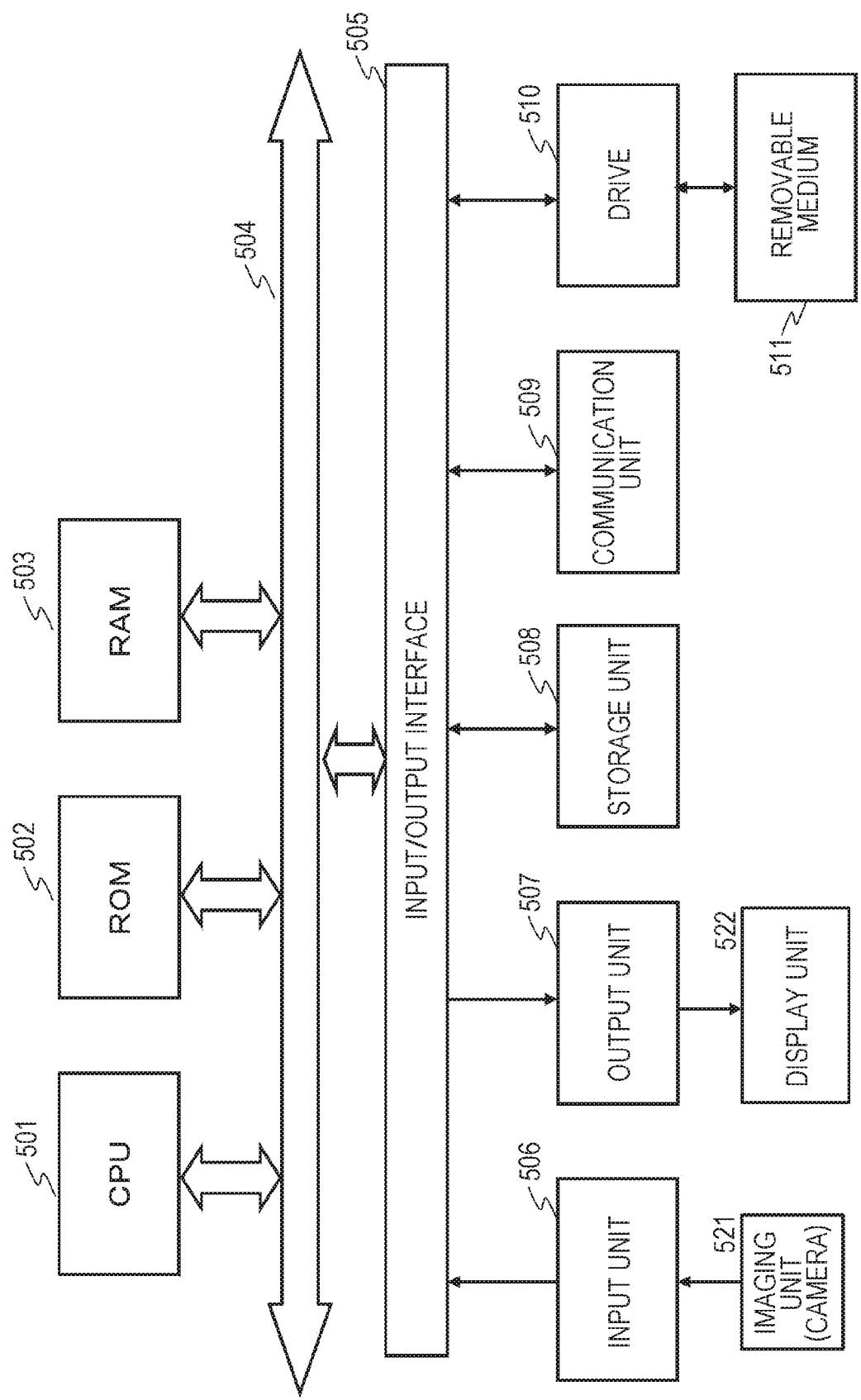
FIG. 22 is a diagram explaining a hardware configuration example of the image processing device.

FIG. 22 is a diagram illustrating a hardware configuration example of an image processing device that executes processing of the present disclosure.

A central processing unit (CPU) 501 functions as a control unit or a data processing unit that executes various processing according to a program stored in a read only memory (ROM) 502 or a storage unit 508. For example, the processing according to the sequence described in the above embodiments is executed. In a random access memory (RAM) 503, a program executed by the CPU 501, data, and the like are stored. The CPU 501, the ROM 502, and the RAM 503 are mutually connected by bus 504.

The CPU 501 is connected to an input/output interface 505 via the bus 504. The input/output interface 505 is connected with an input unit 506, which receives a captured image of an imaging unit 521, the input unit 506 including various switches, a keyboard, a mouse, a microphone, or the like with which a user can perform input, and an output unit 507 for executing data output to a display unit 522, a speaker, or the like. The CPU 501 executes various processing in accordance with an instruction input from the input unit 506 and outputs a processing result to the output unit 507, for example.

The storage unit 508 connected to the input/output interface 505 includes, for example, a hard disk or the like and stores a program to be executed by the CPU 501 and various types of data. The communication unit 509 functions as a transmission/reception unit for Wi-Fi communication, Bluetooth (registered trademark) (BT) communication, or other data communication via a network such as the Internet and a local area network and communicates with an external device.

A drive 510 connected to the input/output interface 505 drives a removable medium 511 such as a magnetic disk, an optical disk, a magneto-optical disk, a semiconductor memory such as a memory card and executes recording or reading of data.

[7. Summary of Configurations of the Present Disclosure]

As described above, the embodiments of the present disclosure have been described in detail with reference to specific embodiments. However, it is obvious that those skilled in the art can make modifications or substitutions of the embodiments within a scope not departing from the principals of the present disclosure. That is, the present invention has been disclosed in the form of exemplification and thus should not be interpreted in a limited manner. In order to judge the gist of the present disclosure, Claims should be taken into consideration.

Note that the technology disclosed herein may also employ configurations as follows.

(1) An image processing device, including:
a feature amount calculating unit for receiving an infrared light image and a visible light image and extracting a feature amount from at least one of the images; and
an image correcting unit for executing pixel value correction processing on the infrared light image on the basis of a reference area and a correction parameter determined depending on the feature amount.

(2) The image processing device according to item (1), further including:
a tap selection unit for determining the reference area used for the pixel value correction in the image correcting unit on the basis of the feature amount; and
a correction parameter calculating unit for determining the correction parameter used for the pixel value correction in the image correcting unit on the basis of the feature amount,
in which the image correcting unit executes the pixel value correction processing in which a tap determined by the tap selection unit and the correction parameter determined by the correction parameter calculating unit are applied.

(3) The image processing device according to item (1) or (2),
in which the feature amount calculating unit extracts any one of the following feature amounts (a) to (c):
(a) luminance distribution information;
(b) blur mode information; and
(c) noise information,
from at least one of the infrared light image and the visible light image.

(4) The image processing device according to any one of items (1) to (3),
in which the feature amount calculating unit acquires luminance distribution information from the infrared light image and the visible light image, and
the image correcting unit executes the pixel value correction processing of the infrared light image such that a shift between a luminance distribution of the infrared light image and that of the visible light image is eliminated.

(5) The image processing device according to item (4), further including:
a tap selection unit for determining the reference area used for the pixel value correction in the image correcting unit on the basis of the feature amount; and
a correction parameter calculating unit for determining the correction parameter used for the pixel value correction in the image correcting unit on the basis of the feature amount,
in which the tap selection unit sets a wider reference pixel area (tap area) as the shift between the luminance distribution of the infrared light image and that of the visible light image is large,
the correction parameter calculating unit determines a correction parameter for eliminating the shift between the luminance distribution of the infrared light image and that of the visible light image, and
the image correcting unit executes the pixel value correction processing in which a tap determined by the tap selection unit and the correction parameter determined by the correction parameter calculating unit are applied.

(6) The image processing device according to any one of items (1) to (5),
in which the feature amount calculating unit acquires blur mode information from the infrared light image, and
the image correcting unit executes the pixel value correction processing of the infrared light image such that a blur in the infrared light image is reduced.

(7) The image processing device according to item (6), further including:
a tap selection unit for determining the reference area used for the pixel value correction in the image correcting unit on the basis of the feature amount; and a correction parameter calculating unit for determining the correction parameter used for the pixel value correction in the image correcting unit on the basis of the feature amount, in which the tap selection unit sets a wider reference pixel area (tap area) as a blurred range of the infrared light image is large, the correction parameter calculating unit determines a correction parameter for eliminating the blur in the infrared light image, and the image correcting unit executes the pixel value correction processing in which a tap determined by the tap selection unit and the correction parameter determined by the correction parameter calculating unit are applied.

(8) The image processing device according to any one of items (1) to (7), in which the feature amount calculating unit acquires noise information from the visible light image, and the image correcting unit executes the pixel value correction processing of the infrared light image such that noise in the infrared light image is reduced.

(9) The image processing device according to item (8), further including:

a tap selection unit for determining the reference area used for the pixel value correction in the image correcting unit on the basis of the feature amount; and a correction parameter calculating unit for determining the correction parameter used for the pixel value correction in the image correcting unit on the basis of the feature amount, in which the tap selection unit sets a wider reference pixel area (tap area) as noise in the visible light image includes more noise having a low frequency band component, the correction parameter calculating unit determines a correction parameter corresponding to a noise component included in the visible light image, and the image correcting unit executes the pixel value correction processing in which a tap determined by the tap selection unit and the correction parameter determined by the correction parameter calculating unit are applied.

(10) The image processing device according to any one of items (1) to (9), in which the image correcting unit executes the image correction processing on the visible light image by applying a corrected infrared light image acquired as a result of the pixel value correction of the infrared light image.

(11) An imaging device, including:

an infrared light image imaging unit for performing imaging processing of an infrared light image;

a visible light image imaging unit for performing imaging processing of a visible light image; and an image processing unit for receiving the infrared light image and the visible light image and executing pixel value correction processing of at least one of the images, in which the image processing unit includes: a feature amount calculating unit for receiving the infrared light image and the visible light image and extracting a feature amount from at least one of the images; and an image correcting unit for executing pixel value correction processing on the infrared light image on the basis of a reference area and a correction parameter determined depending on the feature amount.

(12) The imaging device according to item (11), in which the image processing unit further includes:

a tap selection unit for determining the reference area used for the pixel value correction in the image correcting unit on the basis of the feature amount; and a correction parameter calculating unit for determining the correction parameter used for the pixel value correction in the image correcting unit on the basis of the feature amount, and the image correcting unit executes the pixel value correction processing in which a tap determined by the tap selection unit and the correction parameter determined by the correction parameter calculating unit are applied.

(13) The imaging device according to item (11) or (12), in which the feature amount calculating unit extracts any one of the following feature amounts (a) to (c):

(a) luminance distribution information;

(b) blur mode information; and (c) noise information, from at least one of the infrared light image and the visible light image.

(14) An image processing device, including:

a feature amount calculating unit for receiving an infrared light image and extracting a feature amount; and an image correcting unit for executing pixel value correction processing on the infrared light image on the basis of a reference area and a correction parameter determined depending on the feature amount.

(15) The image processing device according to item (14), further including:

a tap selection unit for determining the reference area used for the pixel value correction in the image correcting unit on the basis of the feature amount; and a correction parameter calculating unit for determining the correction parameter used for the pixel value correction in the image correcting unit on the basis of the feature amount, in which the image correcting unit executes the pixel value correction processing in which a tap determined by the tap selection unit and the correction parameter determined by the correction parameter calculating unit are applied.

(16) The image processing device according to item (14) or (15), in which the feature amount calculating unit extracts any one of the following feature amounts (a) to (c):

(a) luminance distribution information;

(b) blur mode information; and (c) noise information, from the infrared light image.

(17) An image processing method executed in an image processing device, the method including:

a feature amount calculating step of receiving, by a feature amount calculating unit, an infrared light image and a visible light image and extracting a feature amount from at least one of the images; and an image correcting step of executing, by an image correcting unit, pixel value correction processing on the infrared light image on the basis of a reference area and a correction parameter determined depending on the feature amount.

(18) A program for causing an image processing device to execute image processing,
in which the program causes a feature amount calculating unit to receive an infrared light image and a visible light image and to extract a feature amount from at least one of the images; and
the program causes an image correcting unit to execute pixel value correction processing on the infrared light image on the basis of a reference area and a correction parameter determined depending on the feature amount.

Meanwhile, a series of processing described herein can be executed by hardware, software, or a composite configuration thereof. In a case where processing by software is executed, a program storing a processing sequence may be installed in a memory in a computer incorporated in dedicated hardware and thereby executed. Alternatively, the program may be installed in a general-purpose computer capable of executing various types of processing and be executed. For example, the program can be recorded in a recording medium in advance. In addition to installation from a recording medium to a computer, the program can be received via a network such as a local area network (LAN) and the Internet and installed on a recording medium such as a built-in hard disk.

Note that the various processing described herein may be executed not only in time series in accordance with the description but also in parallel or separately depending on the processing capability of a device executing the processing or as necessary. In addition, in this specification, the term "system" refers to a logical group configuration of a plurality of devices, and is not limited to those in which devices of respective components are in the same housing.

INDUSTRIAL APPLICABILITY

As described above, according to a configuration of an embodiment of the present disclosure, a device and a method for executing image quality improvement processing of an infrared light image are implemented.

Specifically, included are: a feature amount calculating unit for receiving an infrared light image and a visible light image and extracting a feature amount from at least one of the images; and an image correcting unit for executing pixel value correction processing on the infrared light image on the basis of a reference area and a correction parameter determined depending on the feature amount. Further included are: a tap selection unit for determining the reference area used for the pixel value correction on the basis of the feature amount; and a correction parameter calculating unit for determining the correction parameter used for the pixel value correction on the basis of the feature amount. The image correcting unit executes the pixel value correction processing in which a tap determined by the tap selection unit and the correction parameter determined by the correction parameter calculating unit are applied.

By these flows of processing, a device and a method for executing image quality improvement processing of an infrared light image are implemented.

REFERENCE SIGNS LIST

10 Visible light image
20 Infrared light image
100 Image processing device
101 Control unit
102 Storage unit
103 Codec
104 Input unit
105 Output unit
106 Imaging unit
107 Infrared light image imaging unit
108 Visible light image imaging unit
111 First imaging element
112 Second imaging element
120 Image processing unit
121 Scaler
122 Parallax amount detection & motion amount detection unit
123 Image position matching unit
124 Feature amount calculating unit
125 Tap selection unit
126 Correction parameter calculating unit
127 Image correcting unit
131 Infrared light image correcting unit
132 Visible light image correcting unit
151 Image reducing unit
161 Pseudo-infrared light image generating unit
171 Subtractor
172 Adder
181 Feature amount calculating unit
182 Tap selection unit
183 Correction parameter calculating unit
184 Image correcting unit
191 Corrected infrared light image
192 Visible light image
501 CPU
502 ROM
503 RAM
504 Bus
505 Input/output interface
506 Input unit
507 Output unit
508 Storage unit
509 Communication unit
510 Drive
511 Removable medium
521 Imaging unit
522 Display unit

The invention claimed is:

1. An image processing device, comprising:
circuitry configured to:
acquire luminance distribution information from an infrared light image and a visible light image; and
execute a pixel value correction processing operation on the infrared light image, based on the acquired luminance distribution information,
wherein the pixel value correction processing operation is executed on the infrared light image such that a shift between a luminance distribution of the infrared light image and a luminance distribution of the visible light image is eliminated.

2. The image processing device according to claim 1, wherein the circuitry is further configured to:
determine a reference area of the infrared light image based on the acquired luminance distribution information;
determine a correction parameter based on the acquired luminance distribution information; and
execute the pixel value correction processing operation on the infrared light image based on the determined reference area and the determined correction parameter.

3. The image processing device according to claim 1, wherein the circuitry is further configured to acquire at least one of blur mode information or noise information, from at least one of the infrared light image and the visible light image.

4. The image processing device according to claim 1, wherein the circuitry is further configured to:
   determine a reference area of the infrared light image based on the acquired luminance distribution information,
      wherein a size of the reference area is based on an amount of the shift between the luminance distribution of the infrared light image and the luminance distribution of the visible light image;
   determine a correction parameter based on the acquired luminance distribution information,
      wherein the correction parameter is determined to eliminate the shift between the luminance distribution of the infrared light image and the luminance distribution of the visible light image; and
   execute the pixel value correction processing operation on the infrared light image based on the determined reference area and the determined correction parameter.

5. The image processing device according to claim 1, wherein the circuitry is further configured to:
   acquire blur mode information from the infrared light image; and
   execute the pixel value correction processing operation on the infrared light image to reduce a blur in the infrared light image.

6. The image processing device according to claim 5, wherein the circuitry is further configured to:
   determine a reference area of the infrared light image based on the acquired blur mode information,
      wherein a size of the reference area is based on a size of a blurred range of the infrared light image;
   determine a correction parameter based on the acquired blur mode information,
      wherein the correction parameter is determined to eliminate the blur in the infrared light image; and
   execute the pixel value correction processing operation on the infrared light image based on the determined reference area and the determined correction parameter.

7. The image processing device according to claim 1, wherein the circuitry is further configured to:
   acquire noise information from the visible light image; and
   execute the pixel value correction processing operation on the infrared light image to reduce noise in the infrared light image.

8. The image processing device according to claim 7, further comprising:
   determine a reference area of the infrared light image based on the acquired noise information,
      wherein a size of the reference area is based on a number of a low frequency band component included in the noise;
   determine a correction parameter based on the acquired noise information,
      wherein the determined correction parameter corresponds to a noise component included in the visible light image; and
   execute the pixel value correction processing operation on the infrared light image based on the determined reference area and the determined correction parameter.

9. The image processing device according to claim 1, wherein the circuitry is further configured to execute an image correction processing operation on the visible light image based on a result of the pixel value correction processing operation on the infrared light image.

10. An imaging device, comprising:
    an infrared light image imaging device configured to capture an infrared light image;
    a visible light image imaging device configured to capture a visible light image; and
    circuitry configured to:
       acquire luminance distribution information from the captured infrared light image and the captured visible light image; and
       execute a pixel value correction processing operation on the infrared light image, based on the acquired luminance distribution information,
          wherein the pixel value correction processing operation is executed on the infrared light image such that a shift between a luminance distribution of the infrared light image and a luminance distribution of the visible light image is eliminated.

11. The imaging device according to claim 10, wherein the circuitry is further configured to:
    determine a reference area of the infrared light image, based on the acquired luminance distribution information;
    determine a correction parameter based on the acquired luminance distribution information; and
    execute the pixel value correction processing operation on the infrared light image based on the determined reference area and the determined correction parameter.

12. The imaging device according to claim 10, wherein the circuitry is further configured to acquire at least one of blur mode information or noise information, from at least one of the infrared light image and the visible light image.

13. An image processing method, comprising:
    in an image processing device:
    acquiring, by circuitry of the image processing device, luminance distribution information from an infrared light image and a visible light image; and
    executing, by the circuitry, a pixel value correction processing operation on the infrared light image, based on the acquired luminance distribution information,
       wherein the pixel value correction processing operation is executed on the infrared light image such that a shift between a luminance distribution of the infrared light image and a luminance distribution of the visible light image is eliminated.

14. A non-transitory computer-readable medium having stored thereon, computer-executable instructions, which when executed by an image processing device, cause the image processing device to execute operations, the operations comprising:
    acquiring luminance distribution information from an infrared light image and a visible light image; and
    executing a pixel value correction processing operation on the infrared light image, based on the acquired luminance distribution information,
       wherein the pixel value correction processing operation is executed on the infrared light image such that a shift between a luminance distribution of the infrared light image and a luminance distribution of the visible light image is eliminated.

* * * * *